(12) United States Patent
Hirayama

(10) Patent No.: US 7,778,508 B2
(45) Date of Patent: Aug. 17, 2010

(54) IMAGE DISPLAY OPTICAL SYSTEM, IMAGE DISPLAY UNIT, ILLUMINATING OPTICAL SYSTEM, AND LIQUID CRYSTAL DISPLAY UNIT

(75) Inventor: Yoshikazu Hirayama, Chiba-ken (JP)

(73) Assignee: Nikon Corporation, Tokyo (JP)

( * ) Notice: Subject to any disclaimer, the term of this patent is extended or adjusted under 35 U.S.C. 154(b) by 593 days.

(21) Appl. No.: 11/792,218

(22) PCT Filed: Aug. 29, 2005

(86) PCT No.: PCT/JP2005/015656

§ 371 (c)(1),
(2), (4) Date: Jun. 1, 2007

(87) PCT Pub. No.: WO2006/061927

PCT Pub. Date: Jun. 15, 2006

(65) Prior Publication Data

US 2008/0094586 A1   Apr. 24, 2008

(30) Foreign Application Priority Data

Dec. 6, 2004   (JP) ............................... 2004-353006

(51) Int. Cl.
*G02B 6/34*   (2006.01)
*G02F 1/1335*   (2006.01)
*G03B 21/28*   (2006.01)
*G03H 1/00*   (2006.01)
*F21V 7/04*   (2006.01)

(52) U.S. Cl. .................. 385/36; 385/129; 385/146; 385/901; 349/13; 349/113; 349/158; 349/201; 353/98; 359/1; 359/13; 362/618; 362/620; 362/623; 362/624; 362/626

(58) Field of Classification Search .................. 385/36, 385/37, 146, 147, 129, 130, 131, 14, 116, 385/115, 120, 901; 349/13, 15, 56, 57, 67, 349/112, 113, 158, 201; 359/1, 13, 30, 34; 362/606, 608, 609, 610, 618, 619, 620, 621, 362/622, 623, 624, 625, 626, 627; 353/98
See application file for complete search history.

(56) References Cited

U.S. PATENT DOCUMENTS 4,309,070 A   1/1982   St. Leger Searle
(Continued)

FOREIGN PATENT DOCUMENTS

EP   1544537 A1   6/2005
(Continued)

OTHER PUBLICATIONS

International Preliminary Report on Patentability, dated Jun. 21, 2007, from corresponding application No. PCT/JP2005/015656, filed Aug. 29, 2005.

*Primary Examiner*—Brian M Healy
(74) *Attorney, Agent, or Firm*—Klarquist Sparkman, LLP

(57) ABSTRACT

Image display optical systems are disclosed that extend the angle of view longitudinally and transversely while saving space. The image display optical system includes a prism-shaped substrate transparent to an image-carrying light flux to be projected to a viewing eye, an introduction unit that guides the image-carrying light flux to a propagation path through which the image-carrying light flux propagates in a direction in which the image-carrying light flux from the outside enables internal reflection at least at three surfaces including at least one side of the substrate, and an output unit that guides the image-carrying light flux propagating through the substrate from the substrate to the viewing eye. By internally reflecting the image-carrying light flux at all the sides, i.e., three or more sides of the prism-shaped substrate, the propagation path is folded to be smaller and extends the opening angle of the light ray included in the image-carrying light flux longitudinally and transversely without increasing the substrate's size.

17 Claims, 26 Drawing Sheets

U.S. PATENT DOCUMENTS

| | | | |
|---|---|---|---|
| 5,341,230 A * | 8/1994 | Smith | 359/13 |
| 5,594,830 A * | 1/1997 | Winston et al. | 385/146 |
| 5,892,598 A * | 4/1999 | Asakawa et al. | 359/13 |
| 5,898,511 A * | 4/1999 | Mizutani et al. | 359/13 |
| 6,667,782 B1 | 12/2003 | Taira et al. | |
| 6,825,987 B2 | 11/2004 | Repetto et al. | |
| 6,829,095 B2 | 12/2004 | Amitai | |
| 2003/0137823 A1 | 7/2003 | Miyashita | |
| 2004/0085649 A1 * | 5/2004 | Repetto et al. | 359/633 |
| 2008/0094586 A1 * | 4/2008 | Hirayama | 353/98 |
| 2009/0154198 A1 * | 6/2009 | Lee et al. | 362/624 |

FOREIGN PATENT DOCUMENTS

| | | |
|---|---|---|
| JP | 2001-110218 | 4/2001 |
| JP | 2003-215346 | 7/2003 |
| JP | 2003-536102 | 12/2003 |
| JP | 2004-111384 | 4/2004 |
| JP | 2004-157520 | 6/2004 |

* cited by examiner

Fig. 19
(a) 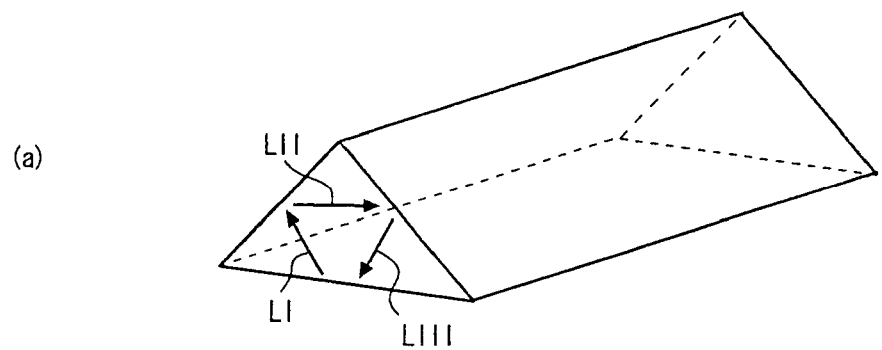
(b) 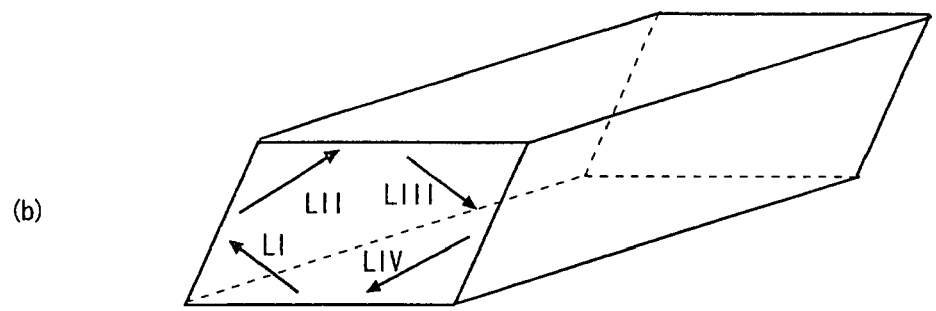
(c) 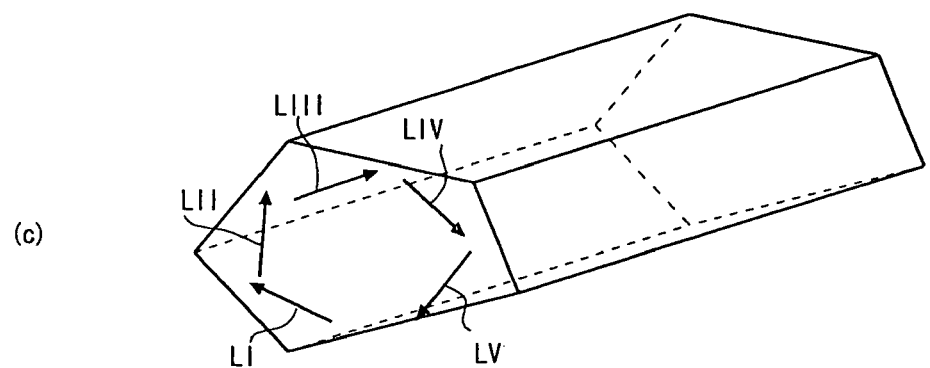

Fig. 28

INCIDENT LIGHT PARAMETER / DIRECTION COSINE OF INCIDENT LIGHT RAY

| θx | θy | θz | α | β | γ | |
|---|---|---|---|---|---|---|
| 90.00 | 90.00 | 0.00 | 0.0000 | 0.0000 | 1.0000 | ← Ai |
| | | θxy-x | | | | |
| | | 0.00 | | | | |

Fig. 29

LIGHT RAY I PARAMETER / DIRECTION COSINE OF LIGHT RAY I

| θx | θy | θz | α | β | γ | |
|---|---|---|---|---|---|---|
| 60.00 | 60.00 | 135.00 | 0.5000 | 0.5000 | -0.7071 | ← At |
| | | θxy-x | | | | |
| | | 45.00 | | | | |

Fig. 30

DIRECTION COSINE OF LIGHT RAY 1 / INCIDENT ANGLE ON MIRROR / PARAMETER OF INCIDENT MIRROR ARRANGEMENT

| α | β | γ | θ0 | α0 | β0 | γ0 | |
|---|---|---|---|---|---|---|---|
| 0.5000 | 0.5000 | -0.7071 | 22.50 | 0.2706 | 0.2706 | -0.9239 | ← Ao |
| | | | | θx | θy | θz | |
| | | | | 74.30 | 74.30 | 157.50 | |
| | | | | θ0xy-x | θ0z | | |
| | | | | 45.00 | 22.50 | | |

Fig. 31

EMITTED LIGHT PARAMETER / DIRECTION COSINE OF EMITTED LIGHT RAY

| θx | θy | θz | α' | β' | γ' | |
|---|---|---|---|---|---|---|
| 90.00 | 90.00 | 180.00 | 0.0000 | 0.0000 | -1.0000 | ← A' |
| | | θxy-x | | | | |
| | | 0.00 | | | | |

Fig. 32

DIRECTION COSINE OF LIGHT RAY I / INCIDENT ANGLE ON MIRROR / PARAMETER OF DEFLECTION MIRROR ARRANGEMENT Am / ANGLE FORMED BY EACH LIGHT RAY WITH MIRROR NORMAL

| α | β | γ | θm | αm | βm | γm | I | II | III | IV |
|---|---|---|---|---|---|---|---|---|---|---|
| 0.5000 | 0.5000 | -0.7071 | 67.50 | -0.6533 | -0.6533 | -0.3827 | 67.50 | 22.50 | 105.70 | 74.30 |
| | | | | θx | θy | θz | | | | |
| | | | | 130.79 | 130.79 | 112.50 | | | | |
| | | | | θmxy-x | θmz | | | | | |
| | | | | -135.00 | 67.50 | | 67.50 | 22.50 | 74.30 | 74.30 |

MIRROR INCIDENT ANGLE OF EACH LIGHT RAY

Fig. 33

DIRECTION COSINE OF LIGHT RAY II / INCIDENT ANGLE ON MIRROR / PARAMETER OF DEFLECTION MIRROR ARRANGEMENT Am / ANGLE FORMED BY EACH LIGHT RAY WITH MIRROR NORMAL

| α | β | -γ | θm | αm | βm | γm | I | II | III | IV |
|---|---|---|---|---|---|---|---|---|---|---|
| 0.5000 | 0.5000 | 0.7071 | 22.50 | -0.2706 | -0.2706 | -0.9239 | 112.50 | 22.50 | 130.79 | 49.21 |
| | | | | θx | θy | θz | | | | |
| | | | | 105.70 | 105.70 | 157.50 | | | | |
| | | | | θmxy-x | θmz | | | | | |
| | | | | -135.00 | 22.50 | | 67.50 | 22.50 | 49.21 | 49.21 |

MIRROR INCIDENT ANGLE OF EACH LIGHT RAY

Fig. 34

DIRECTION COSINE OF LIGHT RAY III

PARAMETER OF DEFLECTION MIRROR ARRANGEMENT

INCIDENT ANGLE ON MIRROR $A_m$

ANGLE FORMED BY EACH LIGHT RAY WITH MIRROR NORMAL

| $\alpha$ | $-\beta$ | $\gamma$ | $\theta m$ | $\alpha m$ | $\beta m$ | $\gamma m$ | I | II | III | IV |
|---|---|---|---|---|---|---|---|---|---|---|
| 0.5000 | -0.5000 | -0.7071 | 67.50 | -0.6533 | 0.6533 | -0.3827 | 105.70 | 74.30 | 67.50 | 22.50 |
| | | | | $\theta x$ | $\theta y$ | $\theta z$ | | | | |
| | | | | 130.79 | 49.21 | 112.50 | | | | |
| | | | | $\theta mxy-x$ | $\theta mz$ | | | | | |
| | | | | 135.00 | 67.50 | 74.30 | 74.30 | 67.50 | 22.50 | |

MIRROR INCIDENT ANGLE OF EACH LIGHT RAY

Fig. 35

DIRECTION COSINE OF LIGHT RAY IV

PARAMETER OF DEFLECTION MIRROR ARRANGEMENT

INCIDENT ANGLE ON MIRROR $A_m$

ANGLE FORMED BY EACH LIGHT RAY WITH MIRROR NORMAL

| $\alpha$ | $-\beta$ | $-\gamma$ | $\theta m$ | $\alpha m$ | $\beta m$ | $\gamma m$ | I | II | III | IV |
|---|---|---|---|---|---|---|---|---|---|---|
| 0.5000 | -0.5000 | 0.7071 | 22.50 | -0.2706 | 0.2706 | -0.9239 | 130.79 | 49.21 | 112.50 | 22.50 |
| | | | | $\theta x$ | $\theta y$ | $\theta z$ | | | | |
| | | | | 105.70 | 74.30 | 157.50 | | | | |
| | | | | $\theta mxy-x$ | $\theta mz$ | | | | | |
| | | | | 135.00 | 22.50 | 49.21 | 49.21 | 67.50 | 22.50 | |

MIRROR INCIDENT ANGLE OF EACH LIGHT RAY

Fig. 36

PLANE SUBSTRATE

| LAYER NO | REFRACTIVE INDEX | LAYER THICKNESS (nd/λ) |
|---|---|---|
|  | 1.56 |  |
| 1 | 1.67 | 0.125 |
| 2 | 1.46 | 0.250 |
| 3 | 1.67 | 0.250 |
| 4 | 1.46 | 0.250 |
| 5 | 1.67 | 0.250 |
| 6 | 1.46 | 0.250 |
| 7 | 1.67 | 0.250 |
| 8 | 1.46 | 0.250 |
| 9 | 1.67 | 0.250 |
| 10 | 1.46 | 0.250 |
| 11 | 1.67 | 0.250 |
| 12 | 1.46 | 0.250 |
| 13 | 1.67 | 0.250 |
| 14 | 1.46 | 0.250 |
| 15 | 1.67 | 0.275 |
| 16 | 1.46 | 0.300 |
| 17 | 1.67 | 0.300 |
| 18 | 1.46 | 0.300 |
| 19 | 1.67 | 0.300 |
| 20 | 1.46 | 0.300 |
| 21 | 1.67 | 0.300 |
| 22 | 1.46 | 0.300 |
| 23 | 1.67 | 0.300 |
| 24 | 1.46 | 0.300 |
| 25 | 1.67 | 0.300 |
| 26 | 1.46 | 0.300 |
| 27 | 1.67 | 0.300 |
| 28 | 1.46 | 0.300 |
| 29 | 1.67 | 0.325 |
| 30 | 1.46 | 0.350 |
| 31 | 1.67 | 0.350 |
| 32 | 1.46 | 0.350 |
| 33 | 1.67 | 0.350 |
| 34 | 1.46 | 0.350 |
| 35 | 1.67 | 0.350 |
| 36 | 1.46 | 0.350 |
| 37 | 1.67 | 0.350 |
| 38 | 1.46 | 0.350 |
| 39 | 1.67 | 0.350 |
| 40 | 1.46 | 0.350 |
| 41 | 1.67 | 0.350 |
| 42 | 1.46 | 0.350 |
| 43 | 1.67 | 0.380 |
| 44 | 1.46 | 0.410 |
| 45 | 1.67 | 0.410 |
| 46 | 1.46 | 0.410 |
| 47 | 1.67 | 0.410 |
| 48 | 1.46 | 0.410 |
| 49 | 1.67 | 0.410 |
| 50 | 1.46 | 0.410 |
| 51 | 1.67 | 0.410 |
| 52 | 1.46 | 0.410 |
| 53 | 1.67 | 0.410 |
| 54 | 1.46 | 0.410 |
| 55 | 1.67 | 0.410 |
| 56 | 1.46 | 0.410 |
| 57 | 1.67 | 0.205 |
|  | 1.56 |  |

PLANE SUBSTRATE

Fig. 37

| LAYER NO | REFRACTIVE INDEX | LAYER THICKNESS (nd/λ) |
|---|---|---|
|  | 1.56 |  |
| 1 | 1.67 | 0.2212 |
| 2 | 1.46 | 0.2137 |
| 3 | 1.67 | 0.2812 |
| 4 | 1.46 | 0.2188 |
| 5 | 1.67 | 0.2501 |
| 6 | 1.46 | 0.2534 |
| 7 | 1.67 | 0.2052 |
| 8 | 1.46 | 0.2246 |
| 9 | 1.67 | 0.2498 |
| 10 | 1.46 | 0.2916 |
| 11 | 1.67 | 0.2782 |
| 12 | 1.46 | 0.2383 |
| 13 | 1.67 | 0.2477 |
| 14 | 1.46 | 0.2668 |
| 15 | 1.67 | 0.2772 |
| 16 | 1.46 | 0.2940 |
| 17 | 1.67 | 0.2755 |
| 18 | 1.46 | 0.2786 |
| 19 | 1.67 | 0.2855 |
| 20 | 1.46 | 0.2915 |
| 21 | 1.67 | 0.3187 |
| 22 | 1.46 | 0.2957 |
| 23 | 1.67 | 0.2938 |
| 24 | 1.46 | 0.2691 |
| 25 | 1.67 | 0.2920 |
| 26 | 1.46 | 0.3146 |
| 27 | 1.67 | 0.3167 |
| 28 | 1.46 | 0.3533 |
| 29 | 1.67 | 0.3022 |
| 30 | 1.46 | 0.3792 |
| 31 | 1.67 | 0.3029 |
| 32 | 1.46 | 0.3874 |
| 33 | 1.67 | 0.3020 |
| 34 | 1.46 | 0.3737 |
| 35 | 1.67 | 0.2870 |
| 36 | 1.46 | 0.3756 |
| 37 | 1.67 | 0.2971 |
| 38 | 1.46 | 0.3985 |
| 39 | 1.67 | 0.3690 |
| 40 | 1.46 | 0.3769 |
| 41 | 1.67 | 0.4230 |
| 42 | 1.46 | 0.3572 |
| 43 | 1.67 | 0.4075 |
| 44 | 1.46 | 0.3520 |
| 45 | 1.67 | 0.4392 |
| 46 | 1.46 | 0.3426 |
| 47 | 1.67 | 0.4585 |
| 48 | 1.46 | 0.4115 |
| 49 | 1.67 | 0.4417 |
| 50 | 1.46 | 0.4104 |
| 51 | 1.67 | 0.4604 |
| 52 | 1.46 | 0.1991 |
| 53 | 1.67 | 0.1095 |
| 54 | 1.46 | 0.0698 |
| 55 | 1.67 | 0.3462 |
|  | 1.56 |  |

PLANE SUBSTRATE (top)

PLANE SUBSTRATE (bottom)

Fig. 38

PLANE SUBSTRATE

| LAYER NO | REFRACTIVE INDEX | LAYER THICKNESS (nd/λ) |
|---|---|---|
|  | 1.56 |  |
| 1 | 2.30 | 0.0933 |
| 2 | 1.46 | 0.1582 |
| 3 | 2.30 | 0.1213 |
| 4 | 1.46 | 0.1118 |
| 5 | 2.30 | 0.0893 |
| 6 | 1.46 | 0.1708 |
| 7 | 2.30 | 0.0701 |
| 8 | 1.46 | 0.0574 |
| 9 | 2.30 | 0.1245 |
| 10 | 1.46 | 0.1867 |
| 11 | 2.30 | 0.1457 |
| 12 | 1.46 | 0.3137 |
| 13 | 2.30 | 0.1825 |
| 14 | 1.46 | 0.2041 |
| 15 | 2.30 | 0.1219 |
| 16 | 1.46 | 0.3578 |
| 17 | 2.30 | 0.0706 |
| 18 | 1.46 | 0.0075 |
| 19 | 2.30 | 0.1716 |
| 20 | 1.46 | 0.4723 |
| 21 | 2.30 | 0.2214 |
| 22 | 1.46 | 0.3989 |
| 23 | 2.30 | 0.0599 |
|  | 1.56 |  |

PLANE SUBSTRATE

Fig. 39

PLANE SUBSTRATE

| LAYER NO | REFRACTIVE INDEX | LAYER THICKNESS (nd/λ) |
|---|---|---|
|  | 1.56 |  |
| 1 | 2.30 | 0.0976 |
| 2 | 1.46 | 0.2523 |
| 3 | 2.30 | 0.1748 |
| 4 | 1.46 | 0.2895 |
| 5 | 2.30 | 0.2062 |
| 6 | 1.46 | 0.3746 |
| 7 | 2.30 | 0.1481 |
| 8 | 1.46 | 0.3359 |
| 9 | 2.30 | 0.1650 |
| 10 | 1.46 | 0.4888 |
| 11 | 2.30 | 0.0841 |
| 12 | 1.46 | 0.0050 |
| 13 | 2.30 | 0.1838 |
| 14 | 1.46 | 0.3774 |
| 15 | 2.30 | 0.3237 |
| 16 | 1.46 | 0.4904 |
| 17 | 2.30 | 0.1221 |
| 18 | 1.46 | 0.0018 |
| 19 | 2.30 | 0.1033 |
| 20 | 1.46 | 0.6213 |
| 21 | 2.30 | 0.1480 |
| 22 | 1.46 | 0.1843 |
| 23 | 2.30 | 0.0604 |
| 24 | 1.46 | 0.2651 |
|  | 1.56 |  |

PLANE SUBSTRATE

Fig. 40

PLANE SUBSTRATE

| LAYER NO. | REFRACTIVE INDEX | LAYER THICKNESS (nd/λ) |
|---|---|---|
|  | 1.56 |  |
| 1 | 2.30 | 0.1144 |
| 2 | 1.46 | 0.0119 |
| 3 | 2.30 | 0.1906 |
| 4 | 1.46 | 0.1896 |
| 5 | 2.30 | 0.3214 |
| 6 | 1.46 | 0.1292 |
| 7 | 2.30 | 0.0949 |
| 8 | 1.46 | 0.2844 |
| 9 | 2.30 | 0.1195 |
| 10 | 1.46 | 0.2806 |
| 11 | 2.30 | 0.2068 |
| 12 | 1.46 | 0.1322 |
| 13 | 2.30 | 0.6165 |
| 14 | 1.46 | 0.0571 |
| 15 | 2.30 | 0.6339 |
| 16 | 1.46 | 0.0561 |
| 17 | 2.30 | 1.3036 |
| 18 | 1.46 | 0.1060 |
| 19 | 2.30 | 0.6195 |
| 20 | 1.46 | 0.0887 |
| 21 | 2.30 | 0.2229 |
| 22 | 1.46 | 0.2428 |
| 23 | 2.30 | 0.0918 |
| 24 | 1.46 | 0.6379 |
| 25 | 2.30 | 0.2123 |
| 26 | 1.46 | 0.2292 |
| 27 | 2.30 | 0.2129 |
| 28 | 1.46 | 0.0866 |
| 29 | 2.30 | 0.1608 |
| 30 | 1.46 | 0.1171 |
| 31 | 2.30 | 0.1260 |
| 32 | 1.46 | 0.1577 |
| 33 | 2.30 | 0.1704 |
| 34 | 1.46 | 0.1765 |
| 35 | 2.30 | 0.1525 |
| 36 | 1.46 | 0.1445 |
|  | 1.56 |  |

PLANE SUBSTRATE

IMAGE DISPLAY OPTICAL SYSTEM, IMAGE DISPLAY UNIT, ILLUMINATING OPTICAL SYSTEM, AND LIQUID CRYSTAL DISPLAY UNIT

CROSS-REFERENCE TO RELATED APPLICATION

This application is a U.S. National Stage application claiming priority to, and the benefit of, prior-filed International Application No. PCT/JP/2005/015656, filed on Aug. 29, 2005, which claims a priority date of Dec. 6, 2004, based on prior-filed Japan Patent Application No. 2004-353006, the entire contents of which both applications are incorporated herein by reference.

TECHNICAL FIELD

The present invention relates to an image display optical system configured to form a virtual image of a compact image display device, such as an LCD, ahead of a viewing eye in an eyeglass display, head-mount display, camera, mobile phone, binocular, microscope, telescope, etc. In addition, the present invention relates to an image display unit mounting the image display optical system. In addition, the present invention relates to an illuminating optical system to be mounted on a liquid crystal display unit, etc.

In addition, the present invention relates to a liquid crystal display unit mounting the illuminating optical system.

BACKGROUND ART

In recent years, as an image display optical system of this type, one that ensures a wide exit pupil and a wide angle of view has been proposed (see, e.g., Japan Unexamined Patent Application Publication No. 2003-536102.). For example, in the image display optical system described in FIG. 2 of JP 2003-536102, a plurality of partially reflecting surfaces parallel to one another is provided inside a transparent plane substrate. An image-carrying light flux emitted from an image display device, such as a liquid crystal display device, is introduced into the inside of the plane substrate in a state of being formed into a parallel light flux.

The image-carrying light flux introduced into the inside of the plane substrate propagates through the plane substrate while reflecting internally after deflected at a reflecting surface (symbol 16 in FIG. 2 of JP 2003-536102). The image-carrying light flux that propagates through the plane substrate enters the plurality of partially reflecting surfaces (symbol 22 in FIG. 2 of JP 2003-536102) sequentially. Each image-carrying light flux that has entered each partially reflecting surface at the same angle to one another is deflected by the same angle, respectively, and is emitted to the outside of the plane substrate.

As a result, outside the plane substrate, a comparatively large region that the image-carrying light flux with each angle of view emitted from each position of the image display device enters in an overlapping manner is formed. If the pupil of the eye of a viewer is placed at any point in the region, it is possible for the viewer to view the virtual image of the image display device. In other words, this region serves as an equivalent of an exit pupil. Hereinafter, this region is referred to as the "exit pupil".

It is possible to easily extend the exit pupil by increasing the number of partially reflecting surfaces to be arranged. If the exit pupil is wide, the degree of freedom of the position of the pupil of a viewing eye is increased, and therefore, a viewer can view in a more relaxed state. In addition, in FIG. 2 of JP 2003-536102, the image-carrying light flux is drawn as one broken line, however, the actual image-carrying light flux includes each image-carrying light flux with each angle of view.

The image-carrying light flux with each angle of view is introduced into the inside of the plane substrate at different angles and propagates through the plane substrate at different angles while being reflected internally. Consequently, depending on the opening angle of the light ray of the image-carrying light flux that propagates through the plane substrate, the angle of view of the image display optical system is determined. In addition, in the image display optical system, since the propagation path of the image-carrying light flux is folded inside the plane substrate, the opening angle of the light ray capable of propagating through the plane substrate becomes larger than that when not folded.

Consequently, it is possible to ensure a wide angle of view in this image display optical system.

DISCLOSURE OF THE INVENTION

Problems to be Solved by the Invention

However, the angle of view in the image display optical system can be extended in the transverse direction (in the transverse direction on the paper of FIG. 2 of JP 2003-536102), but not in the longitudinal direction (in the direction perpendicular to the surface of the paper of FIG. 2 of JP 2003-536102). Because of this, in FIG. 15 of JP 2003-536102, a technique to extend the angle of view both longitudinally and transversely is described. However, with this technique, the space for arrangement is increased (that is an increase in the plane substrate size) because it is necessary to arrange a plurality of reflecting surfaces with 45°.

Therefore, an object of the present invention is to provide an image display optical system capable of extending the angle of view both longitudinally and transversely while saving space. Further, another object of the present invention is to provide an image display unit with high performance despite its compact size. Furthermore, still another object of the present invention is to provide an illuminating optical system capable of extending the angle of lighting range both longitudinally and transversely while saving space.

In addition, yet another object of the present invention is to provide a liquid crystal display unit with high performance despite its thinness.

Means for Solving the Problems

An image display optical system of the present invention is characterized by including a prism-shaped substrate transparent to an image-carrying light flux to be projected to a viewing eye, an introduction unit that guides the image-carrying light flux in a direction in which the image-carrying light flux from the outside becomes capable of internal reflection at least at three surfaces including at least one side of the substrate, and an output unit that guides the image-carrying light flux that propagates through the substrate from the substrate to the viewing eye.

By the way, the introduction unit may be composed of a reflecting surface nonparallel to all the sides at which the image-carrying light flux is reflected. Further, the output unit may be composed of a plurality of partially reflecting surfaces parallel to one another provided inside the substrate. Furthermore, the output unit may be composed of an optical film provided on at least a portion of the surface of the substrate the image-carrying light flux reaches and which emits part of the image-carrying light flux to the outside, and a plurality of reflecting surfaces parallel to one another provided on the opposite side of the substrate of the optical film.

In addition, any one of the plurality of reflecting surfaces may be composed of a holographic optical film. Further, the output unit may be composed of a holographic optical film provided on any one of the sides of the substrate. Furthermore, an image display unit of the present invention is characterized by including an image display device that emits an image-carrying light flux to be projected to a viewing eye and any one of the image display optical systems of the present invention, which guides the image-carrying light flux to the viewing eye.

In addition, any one of the image display units of the present invention may include a mounting unit that mounts the image display unit on the head of a viewer. Further, an illuminating optical system of the present invention is characterized by including a prism-like substrate transparent to an illumination light flux to illuminate a region to be illuminated, an introduction unit that guides the illumination light flux in a direction in which the illumination light flux from the outside becomes capable of internal reflection at least at three surfaces including at least one side of the substrate, and an output unit that guides the illumination light flux that propagates through the substrate from the substrate to the region to be illuminated.

By the way, the introduction unit may be composed of a reflecting surface nonparallel to all the sides at which the illumination light flux is reflected. Further, the output unit may be composed of a plurality of partially reflecting surfaces parallel to one another provided inside the substrate. In addition, the output unit may be composed of an optical film provided on at least a portion of the surface of the substrate the illumination light flux reaches and which emits part of the illumination light flux to the outside, and a plurality of reflecting surfaces parallel to one another provided on the opposite side of the substrate of the optical film.

In addition, any one of the plurality of reflecting surfaces may be composed of a holographic optical film. Further, the output unit may be composed of a holographic optical film provided on any one of the sides of the substrate. A liquid crystal display unit of the present invention is characterized by including a light source that emits an illumination light flux to illuminate a liquid crystal panel, and any of the illuminating optical systems of the present invention, which guides the illumination light flux to the liquid crystal panel.

According to the present invention, an image display optical system capable of extending the angle of view both longitudinally and transversely while saving space is realized. Further, according to the present invention, an image display unit with high performance despite its compact size is realized. Furthermore, according to the present invention, an illuminating optical system capable of extending the angle of lighting range both longitudinally and transversely while saving space is realized.

In addition, according to the present invention, a liquid crystal display unit with high performance despite its thinness is realized.

BRIEF DESCRIPTION OF THE DRAWINGS

The nature, principles, and utility of the invention will become more apparent from the following detailed description when read in conjunction with the accompanying drawings, in which like parts are designated by identical reference numbers, in which:

FIG. 17 is a diagram showing an emission spectrum of a light source of an image display device 2a;

FIG. 19 is a diagram showing a modification example of a substrate 1;

FIG. 28 is a table showing parameters of the image-carrying light flux L1 incident to the substrate 1;

FIG. 29 is a table showing parameters of the image-carrying light flux L1 immediately after reflected at the introduction mirror 1A;

FIG. 30 is a table showing parameters of the arrangement attitude of the introduction mirror 1A;

FIG. 31 is a table showing parameters of the image-carrying light flux L1 emitted from the substrate 1;

FIG. 32 is a table showing parameters of the arrangement attitude of the deflection mirror 1B to emit a component LI of the image-carrying light flux L1 to the outside of the substrate 1;

FIG. 33 is a table showing parameters of the arrangement attitude of the deflection mirror 1B to emit a component LII of the image-carrying light flux L1 to the outside of the substrate 1;

FIG. 34 is a table showing parameters of the arrangement attitude of the deflection mirror 1B to emit a component LIII of the image-carrying light flux L1 to the outside of the substrate 1;

FIG. 35 is a table showing parameters of the arrangement attitude of the deflection mirror 1B to emit a component LIV of the image-carrying light flux L1 to the outside of the substrate 1;

FIG. 36 is a table showing a configuration of the multilayer film (first embodiment) (in Table 9, "substrate" is expressed by "plane substrate"; this applies to other tables);

FIG. 37 is a table showing a configuration of the multilayer film (second embodiment);

FIG. 38 is a table showing a configuration of the multilayer film (third embodiment);

FIG. 39 is a table showing a configuration of the multilayer film (fourth embodiment); and FIG. 40 is a table showing a configuration of the multilayer film (fifth embodiment).

BEST MODE FOR CARRYING OUT THE INVENTION

First Embodiment

A first embodiment of the present invention will be described below based on FIGS. 1-21 and 28-40.

Figure 1:
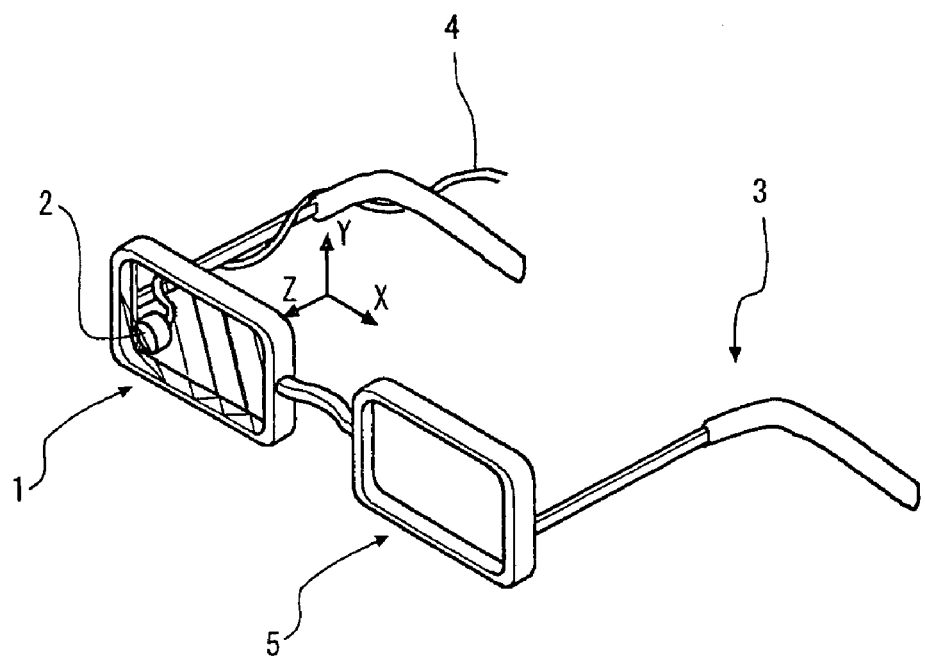
FIG. 1 is an outside appearance of an eyeglass display in a first embodiment.

The present embodiment is an embodiment of an eyeglass display. FIG. 1 is an outside appearance of the present eyeglass display. As shown in FIG. 1, the present eyeglass display includes a substrate 1, an image-introduction unit 2, a cable 4, a glass frame 3 (corresponding to the mounting unit in claims), etc. Here, an eyeglass display for the right eye will be described.

The substrate 1 is composed of a rectangular parallel plane plate transparent to visible light. The shape of the substrate 1 when viewed from the front side is formed into a rectangle substantially the same as that of a glass lens. The substrate 1 is mounted on the right-front of the glass frame 3. The image-introduction unit 2 is a unit mounting an optical system. The image-introduction unit 2 is fixed in the vicinity of the substrate 1 (the right temple of the glass frame 3) and connected with an external device via the cable 4. Signals and power for image display are supplied to the image-introduction unit 2 from the external device.

Such an eyeglass display is mounted on the head of a viewer by the glass frame 3. The surface/undersurface of the substrate 1 face the right eye of the viewer mounting the eyeglass display. The XYZ coordinate system in FIG. 1 is a right-hand XYZ orthogonal coordinates system in which the leftward direction of the viewer mounting the eyeglass display is the X direction, the upward direction is the Y direction, and the forward direction is the Z direction. Hereinafter, the eyeglass display will be described using the expression of the XYZ coordinated system or the expression of the respective directions (leftward/rightward, upward/downward, and longitudinal and transverse directions) when viewed by the viewer.

Figure 2:
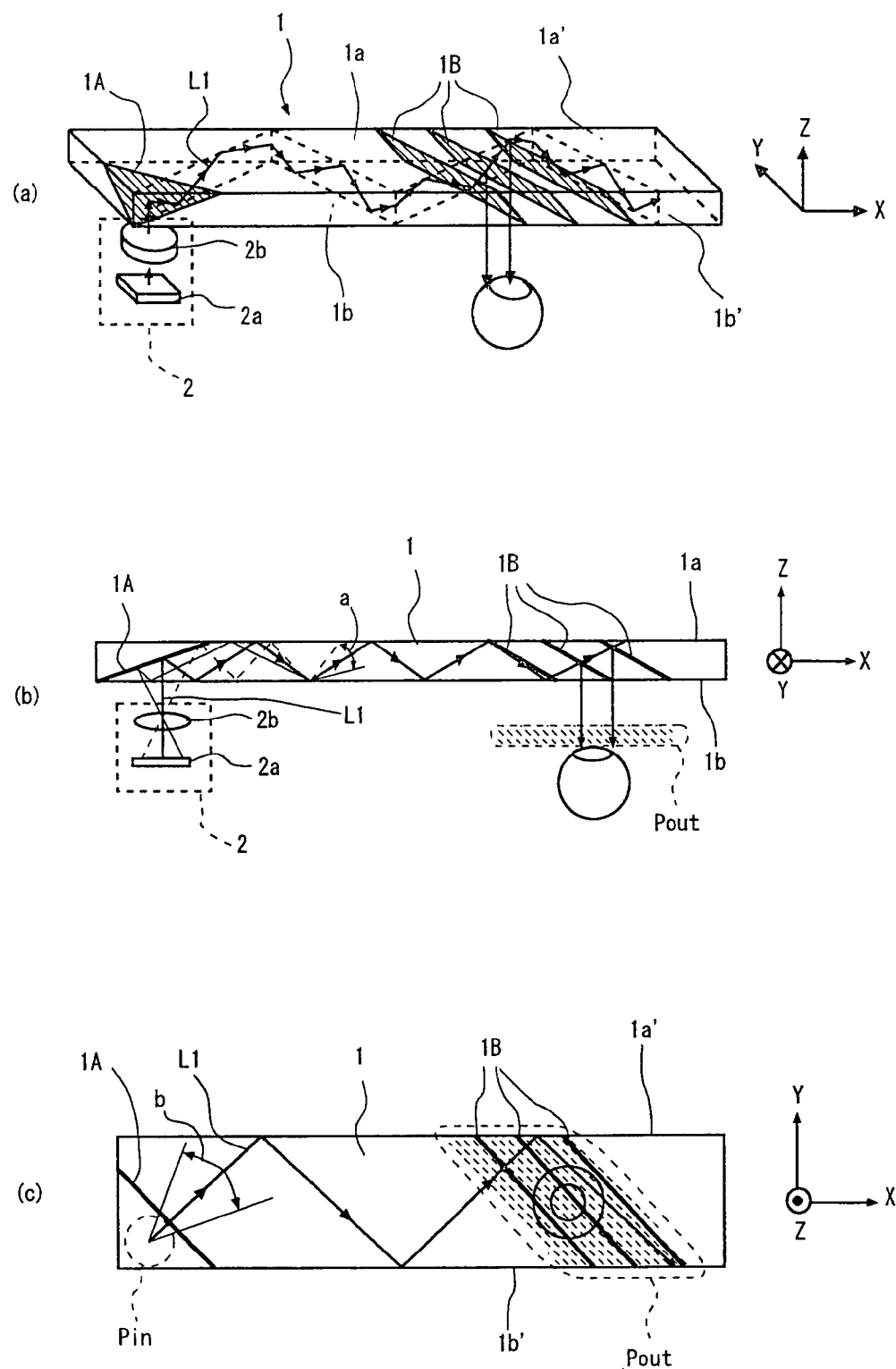
FIG. 2 is a diagram for illustrating the portion of an optical system of the eyeglass display in the first embodiment.

In a state in which the eyeglass display is mounted on the viewer, the image-carrying light flux is introduced from the image-introduction unit 2 to the region at the bottom-right of the substrate 1. FIG. 2 is a diagram for illustrating the portion of the optical system of the present eyeglass display. FIG. 2(a) is a perspective view of the portion of the optical system, FIG. 2(b) is a schematic sectional view when the portion of the optical system is cut in a plane parallel to the XZ plane, and FIG. 2(c) is a schematic sectional view when the portion of the optical system is cut in a plane parallel to the XY plane.

As shown in FIG. 2(a), upper and lower sides 1a', 1b' of the substrate 1 are worked into a plane with the same precision of surface/undersurface 1a, 1b. By the way, the right and left sides of the substrate 1 need not to be worked into a plane because they do not relate to the optical performance of the present eyeglass display. In addition, on the image-introduction unit 2, an image display device 2a, such as an LCD (liquid crystal display device), an objective lens 2b, a not-shown electric circuit, etc., are mounted.

An image-carrying light flux L1 composed of visible light emitted from each position of the image display device 2a is formed into a parallel light flux at the objective lens 2b. By the way, in the figure, only the main light ray emitted from the center of the image display device 2a is shown among the entire image-carrying light flux. In the vicinity of the objective lens 2b, as shown in FIG. 2(c), an entrance pupil Pin is formed which each image-carrying light flux L1 emitted from each position of the image display device 2a enters in an overlapping manner. By the way, the diameter of the entrance pupil Pin is somewhat smaller than that of the upper and lower sides 1a', 1b' of the substrate 1.

The image-carrying light flux L1 emitted from the entrance pupil Pin is introduced into the inside of the substrate 1. In a region that the image-carrying light flux L1 first enters in the substrate 1, an introduction mirror 1A (corresponding to the introduction unit in claims) composed of a reflecting film is arranged. The arrangement attitude of the introduction mirror 1A is optimized so that the propagation path of the image-carrying light flux L1 is formed inside the substrate 1 (details will be described later). When entering the introduction mirror 1A, the image-carrying light flux L1 is internally reflected alternately at the surface/undersurface 1a, 1b of the substrate 1, as shown in FIG. 2(b), and is internally reflected alternately at the upper and lower sides 1a', 1b' of the substrate 1, as shown in FIG. 2(c), propagating in the +X direction of the substrate 1.

Consequently, the optical path of the light ray on each axis of the image-carrying light flux L1 will be a broken-line-shaped optical path that exists in a folding-screen-shaped plane erected on the XY plane, as shown by the dotted line in FIG. 2(a). In a region inside the substrate 1, facing the right eye of the viewer, a plurality of deflection mirrors 1B (corresponding to the output unit in claims) composed of a partially reflecting film and parallel to one another are provided side by side so densely that no gap is seen from the viewer.

The arrangement attitude of the individual deflection mirrors 1B is optimized so that the optical path of the image-carrying light flux L is formed between the substrate 1 and the right eye of the viewer (details will be described later). In addition, the individual deflection mirrors 1B reflect the image-carrying light flux L1 with a predetermined reflectance. The image-carrying light flux L1 having propagated through the substrate 1 enters the individual deflection mirrors 1B, is deflected toward the direction of the right eye of the viewer, respectively, and is emitted to the outside of the substrate 1. The individual image-carrying light fluxes L1 deflected by the individual deflection mirrors 1B enter regions shifted from one another in the vicinity of the right eye of the viewer.

In the vicinity of the right eye of the viewer, as shown in FIGS. 2(b), and 2(c), a wide exit pupil Pout is formed, which each image-carrying light flux L1 emitted from each position of the image display device 2a enters in an overlapping manner. If the pupil of the right eye of the viewer is situated at any place in the exit pupil Pout, the viewer can view the virtual image of the image display device 2a. In addition, an external light flux toward the right eye of the viewer from the external (the distance when viewed from the viewer) transmits through the substrate 1. In addition, the external light flux transmits through the deflection mirror 1B provided inside the substrate 1.

Because of this, the viewer can view the external image as well as the virtual image of the image display device 2a. By the way, the shape of the exit pupil Pout when viewed from the right eye of the viewer is substantially the same as the entire shape of the plurality of the deflection mirrors 1B when viewed from the right eye of the viewer. Incidentally, since the entire shape of the plurality of the deflection mirrors 1B shown in FIG. 2 is a parallelogram, the shape of the exit pupil Pout will also be a parallelogram. The entire shape of the plurality of deflection mirrors 1B may be changed and the shape of the exit pupil Pout may be changed, as needed.

Next, the angle of view of the present eyeglass display will be described. The angle of view of the present eyeglass display is determined by the angles of view in two directions, that is, a first angle of view a shown in FIG. 2(b) and a second angle of view b shown in FIG. 2(c). The first angle of view a is in a proportional relationship with the opening angle formed by two main light rays when two main light rays, among the image-carrying light flux L1 that propagates through the substrate 1, emitted from the outermost pixel of the image display device 2a are projected on a plane parallel to the XZ plane. The second angle of view b is in a proportional relationship with the opening angle formed by two light rays when two main light rays, among the image-carrying light flux L1 that propagates through the substrate 1, emitted from the outermost pixel of the image display device 2a are projected on a plane parallel to the YX plane.

Figure 3:
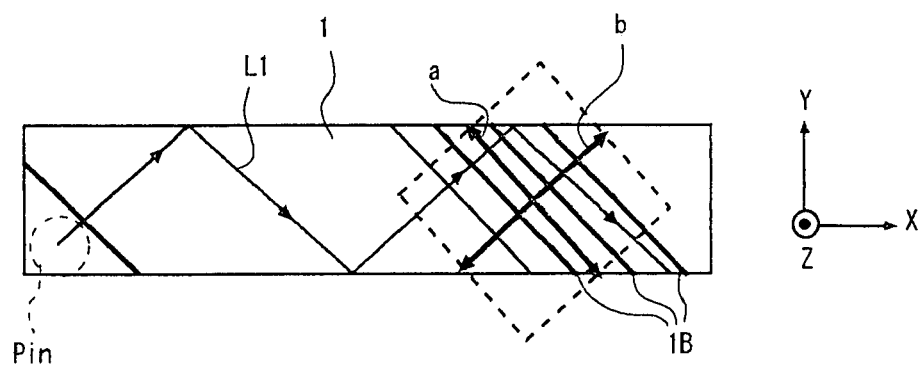
FIG. 3 is a diagram for illustrating an angle of view of the eyeglass display in the first embodiment.

When the first angle of view a and the second angle of view b are viewed from the viewer side, they correspond to the angle of view in the oblique direction as shown in FIG. 3, and when both are extended, the longitudinal and transverse angles of view are extended, as a result. By the way, when it is necessary to match the directions of the first angle of view a and the second angle of view b with the longitudinal and transverse directions when viewed from the viewer, it is only required to incline the attitude of the entire part of the optical system from that shown in FIG. 1, FIG. 2, and FIG. 3.

Next, the effect of the present eyeglass display will be described. In order to facilitate description, the present eyeglass display is compared with a conventional eyeglass display. The conventional eyeglass display is one to which the technique described in JP 2003-536102 has been applied.

Figure 4:
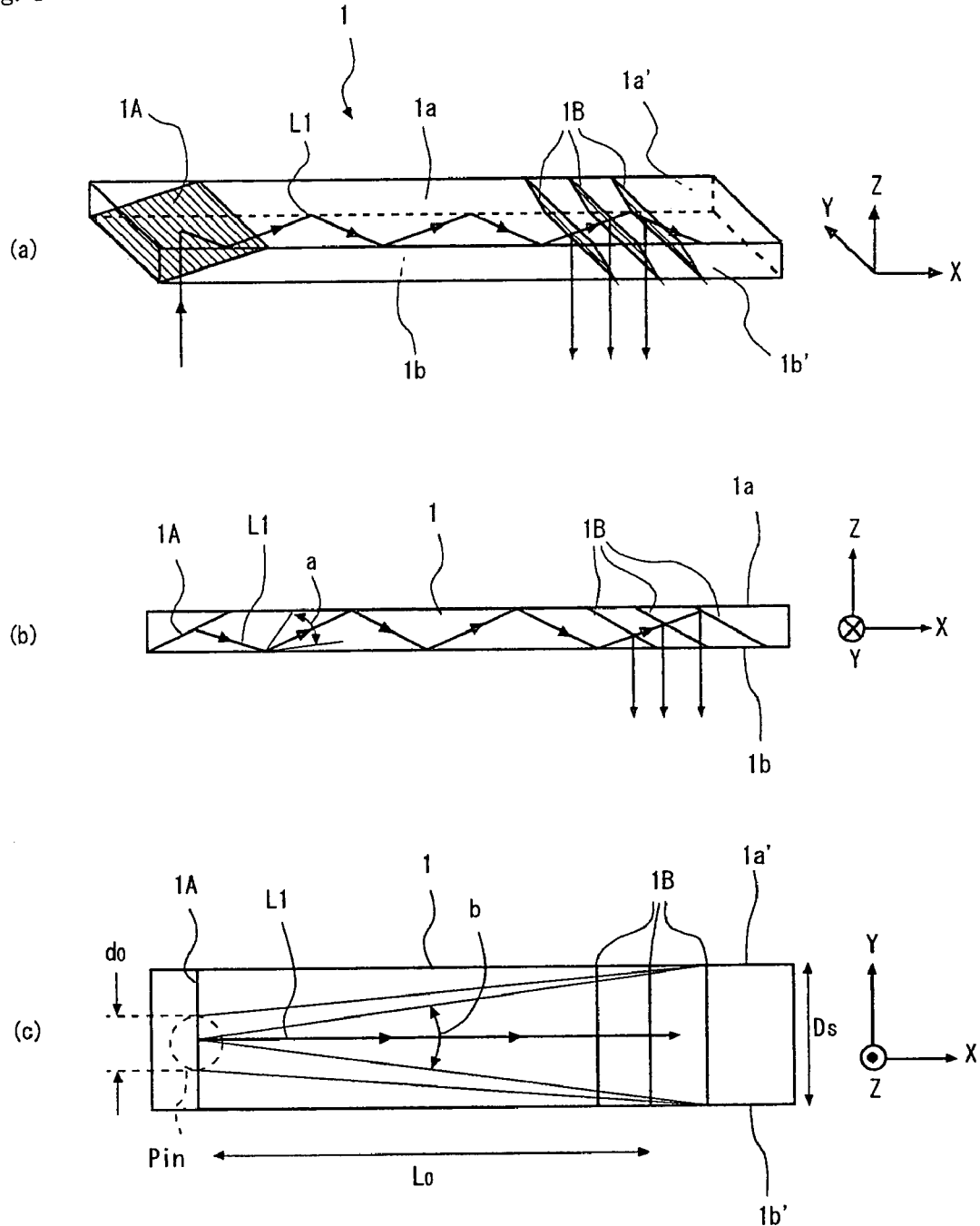
FIG. 4 is a diagram for illustrating the portion of an optical system of a conventional eyeglass display.

In FIG. 4, the portion of the optical system of the conventional eyeglass display is shown. The description method (including symbols) of FIGS. 4(a), 4(b), and 4(c) corresponds to that of FIGS. 2(a), 2(b), and 2(c) (however, the image-introduction unit 2 is omitted in FIG. 4). The propagation path of the image-carrying light flux L1 of the conventional eyeglass display is folded between the surface/undersurface 1a, 1b as shown in FIGS. 4(a), 4(b). Consequently, the first angle of view a (in this case, the angle of view in the X direction) of the conventional eyeglass display is determined by a critical angle θc of the substrate 1.

For example, assuming that the refractive index of the substrate 1 is 1.56 and the medium is air, the critical angle θc will be about 40° and the opening angle of the light ray of the image-carrying light flux L1 capable of propagating through the substrate 1 is 50° at maximum, and therefore, it is possible to extend the first angle of view a of the conventional eyeglass display up to 50°. However, the propagation path of the image-carrying light flux L1 of the conventional eyeglass display is not folded between the upper and lower sides 1a', 1b' as shown in FIGS. 4(a), 4(c). Because of this, the second angle of view b (in this case, the angle of view in the Y direction) of the conventional eyeglass display is determined by the size of the substrate 1, as shown in FIG. 4(c). Specifically, it is expressed by the following expression (1).

In the expression (1):

$$b = 2\tan^{-1}[(Ds - d_0)/2L_0] \quad (1)$$

"Ds" is the longitudinal dimension of the substrate 1, "$d_0$" is the diameter of the entrance pupil Pin, and "$L_0$" is the effective transverse dimension of the substrate 1. For example, assuming that Ds=30 nm, $d_0$=20 mm, and $L_0$=50 mm, the second angle of view b will be 11.4°. In other words, the second angle of view b of the conventional eyeglass display is far less than the first angle of view a.

On the other hand, the propagation path of the image-carrying light flux L1 of the present eyeglass display is folded between the surface/undersurface 1a, 1b as shown in FIGS. 2(a), 2(b). Because of this, the first angle of view a of the present eyeglass display is determined by the critical angle θc of the substrate 1. For example, under the same condition as that of the conventional eyeglass display, the first angle of view a of the present eyeglass display can be extended up to 50°.

In addition, the propagation path of the image-carrying light flux L1 of the present eyeglass display is folded between the upper and lower sides 1a', 1b' as shown in FIGS. 2(a), 2(c). Because of this, the second angle of view b of the present eyeglass display can be extended up to the same angle as that of the first angle of view a. In other words, in the present eyeglass display, the propagation path of the image-carrying light flux L1 is not only folded between the surface/undersurface 1a, 1b but also folded between the upper and lower sides 1a' 1b', and therefore, it is possible to extend the second angle of view b up to the same angle as that of the first angle of view a, that is, to extend the angle of view both longitudinally and transversely without the extension in size of the substrate 1.

Consequently, the present eyeglass display is a high performance eyeglass display capable of displaying the virtual image of the image display device 2a with an angle of view wide both longitudinally and transversely even if the size is the same as that of the conventional eyeglass display. By the way, in the present eyeglass display, only the surfaces that contribute to the internal reflection (that is, the surface/undersurface 1a, 1b and the upper and lower sides 1a', 1b') are worked into a plane, however, if an optical film is provided onto these surfaces, or these surfaces are turned into a diffraction optical surface, it is possible to cause a light ray incident with an incident angle smaller than the critical angle θc of the substrate 1 to be reflected internally inside the substrate 1. If the opening angle of the light ray of the image-carrying light flux L1 that propagates through the substrate 1 is extended in this manner, it is possible to further extend the angle of view of the present eyeglass display.

In addition, as long as the width of the surface that contributes to the internal reflection (that is, the distance between the surface 1a and the surface 1b, the distance between the surface 1a' and the surface 1b') is greater than the diameter of the entrance pupil Pin, the angle of view of the present eyeglass display is not restricted by the size or shape of the substrate 1. Consequently, the degree of freedom of the size and shape of the substrate 1 of the present eyeglass display is high. For example, the longitudinal dimension (the distance between the surface 1a' and the surface 1b') of the substrate 1 of the present eyeglass display is greater than the thickness of the substrate 1 (the distance between the surfaces 1a and the surface 1b), however, even if the former is reduced to the same level of the latter, the angle of view of the present eyeglass display is not at all affected. Because of this, it is possible to turn the shape of the substrate 1 into, for example, a rod-like shape.

The rod-like substrate 1 is one the section of which formed by truncating it in a plane parallel to the YZ plane is a regular polygon (here, a square). In other words, the shape of the substrate 1 can be selected freely in accordance with the fine appearance of the eyeglass display, the structure of the glass frame 3 onto which the substrate is to be mounted, etc. In addition, in the present eyeglass display, the general glass frame 3 is used as the mounting unit that mounts the substrate 1 and the image-introduction unit 2 on the head of the viewer. However, it is possible to change the mounting unit into an optimal one together with the size and the shape of the substrate 1.

Figure 5:
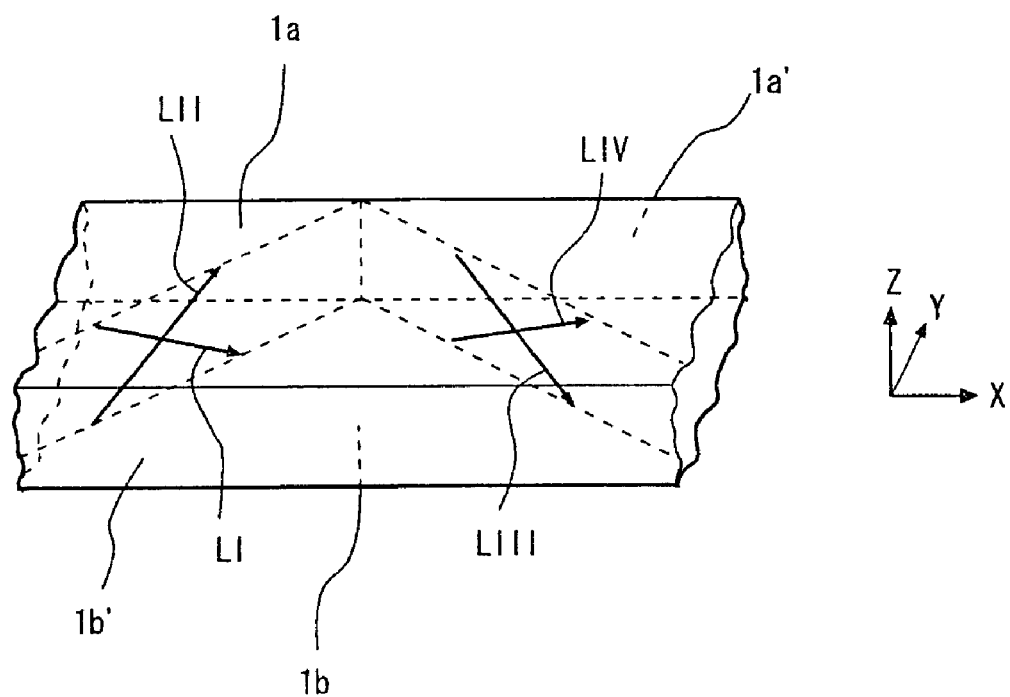
FIG. 5 is a diagram for illustrating each component of an image-carrying light flux L1 in the first embodiment.

Next, the characteristic of the deflection mirror 1B of the present eyeglass display will be described in detail. As shown in FIG. 2, the plurality of the deflection mirrors 1B reflect the image-carrying light flux L1 incident to the substrate 1, respectively, forming the exit pupil Pout outside the substrate 1. However, the light ray on the axis of the image-carrying light flux L1 that propagates through the substrate 1 is in any one of the directions of four components LI, LII, LIII, and LIV irrespective of the position thereof, as shown in FIG. 5. Among these, the component LI is the one immediately after being reflected by the introduction mirror 1A. By the way, in FIG. 5, the four components of a light ray on the axis of the image-carrying light flux L1 are shown.

Among these, only a specific one component needs to be deflected toward the outside of the substrate 1. This is because if components other than the specific one component are deflected, there is the possibility that a ghost of a virtual image may be formed. Because of this, a characteristic is given to the individual deflection mirror 1B so as to reflect any one of the components and transmit other three components, that is, a characteristic is given so as to reflect only the visible light incident in a specific incident angle range.

Figure 6:
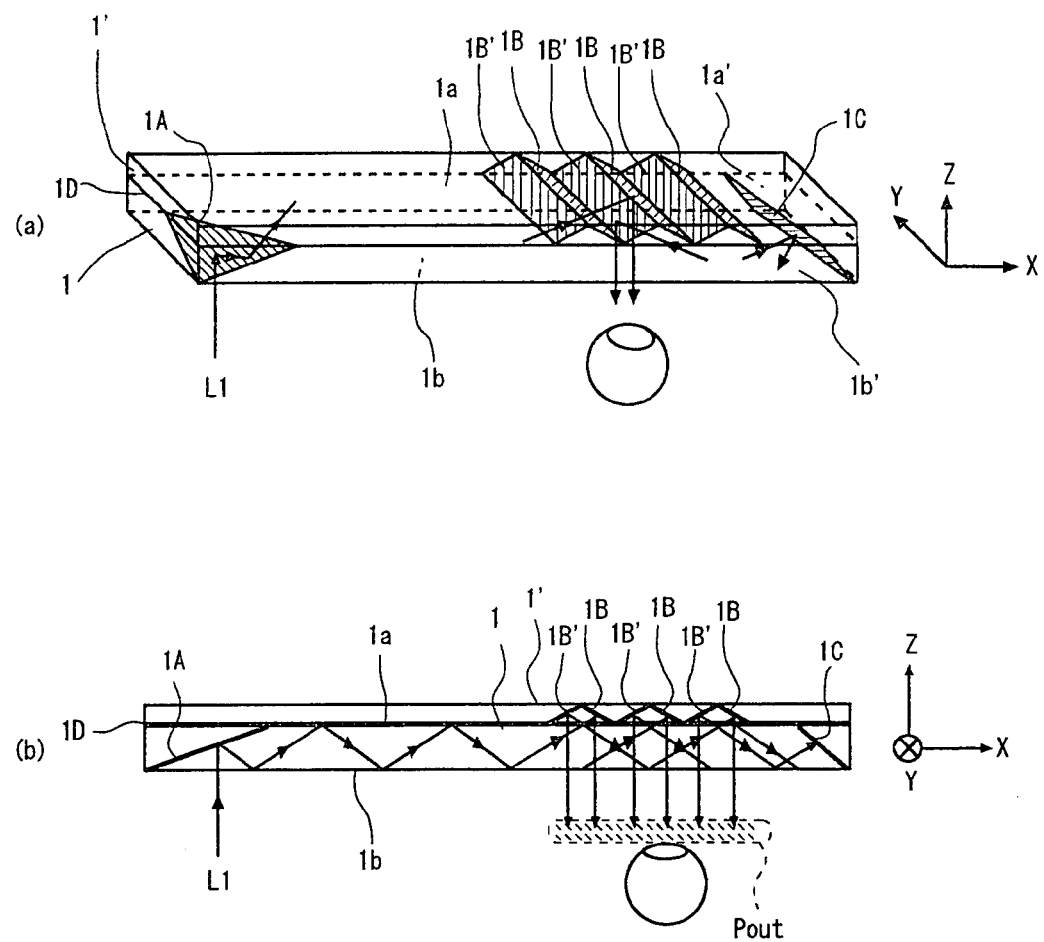
FIG. 6 is a diagram for illustrating a modification example of a plurality of deflection mirrors 1B.

In addition, as described above, a characteristic is given to the individual deflection mirror 1B so as to transmit the external light flux in order not to impede the viewing of the external image by the viewer. By the way, the plurality of the deflection mirrors 1B of the present eyeglass display is provided inside the substrate 1 as shown in FIG. 2. However, the plurality of the deflection mirrors 1B may be provided outside the substrate 1 as shown in FIG. 6. Here, the description method (including symbols) of FIGS. 6(a), 6(b) corresponds to that of FIGS. 2(a), 2(b) (however, in FIG. 6, the image-introduction unit 2 is omitted).

The substrate 1 shown in FIG. 6 is provided with a plane substrate 1' transparent to visible light on the surface 1a as with the substrate 1. Inside the plane substrate 1', the plurality of the deflection mirrors 1B is provided. On the boundary surface between the substrate 1 and the plane substrate 1', an optical film 1D is formed and the optical film 1D plays a role to cause a portion of the image-carrying light flux L1 that is reflected internally inside the substrate 1 to enter the plane substrate 1', that is, a role to cause it to enter the plurality of the deflection mirrors 1B.

A characteristic is give to such an optical film 1D so as to partially reflect visible light incident with a comparatively large incident angle (an incident angle greater than the critical angle θc) and fully transmit other visible light. Incidentally, the optical film 1D is composed of a multilayer film in which a dielectric with a high-refractive index and a dielectric with a low-refractive index are laminated alternately, or a holographic optical film.

By the way, inside the plane substrate 1' shown in FIG. 6, in addition to the plurality of the deflection mirrors 1B, a plurality of deflection mirrors 1B' is provided. Inside the substrate 1, a return mirror 1C is provided. The return mirror 1C is configured to return the image-carrying light flux L 1 having propagated through the substrate 1 in the direction of the optical axis. The plurality of the deflection mirrors 1B' is configured to reflect the image-carrying light flux L1 after returned, respectively, and emit it in the direction of the exit pupil Pout. The respective normals of the deflection mirrors 1B, 1B' exist on the incidence surface of the image-carrying light flux L1.

Due to the return mirror 1C and the deflection mirror 1B', it is possible to suppress the variations in the amount of light of the image-carrying light flux L1 depending on the position on the exit pupil Pout, that is, the variations in the brightness of the virtual image depending on the position on the exit pupil Pout. In addition, in the eyeglass display in FIG. 6, the place of arrangement of the plane substrate 1' provided with the deflection mirror 1B (and the deflection mirror 1B') is on the side of the surface 1a of the substrate 1 (on the side of the external); however, it may be on the side of the surface 1b (on the side of the viewer). In this case also, by optimizing the attitude of the deflection mirror 1B (and the deflection mirror 1B'), it is possible to introduce the image-carrying light flux L1 to the side of the viewer and form the exit pupil Pout similarly.

Next, the method of selecting the arrangement attitude of the introduction mirror 1A and the deflection mirror 1B in the present eyeglass display will be described in detail. Here, a case where the deflection mirror 1B is provided inside the substrate 1 will be described (FIG. 2). In the description, a direction cosine is used as a parameter indicative of a direction. First, the direction cosine will be described.

Figure 7:
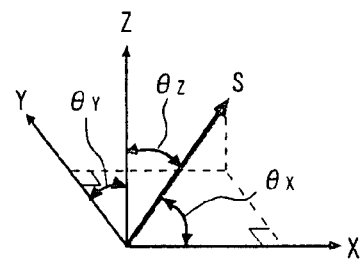
FIG. 7 is a diagram for illustrating a direction vector and a direction cosine.

As shown in FIG. 7, assuming that the angles formed by a direction vector S with the X axis, the Y axis, and the Z axis are θx, θy, and θz, respectively, its direction cosine A=(α, β, γ) is represented as:

$\alpha = \cos \theta x$ $\beta = \cos \theta y$ $\gamma = \cos \theta z$

Using the parameters of the direction cosine described above, each direction is defined as follows. Note that each direction can be defined only by the parameter of the direction cosine. However, for intuitive recognition of each direction, parameters of angle are also added.

Parameters of Direction Cosine $$AI = (\alpha, \beta, \gamma)$$

Figure 8:
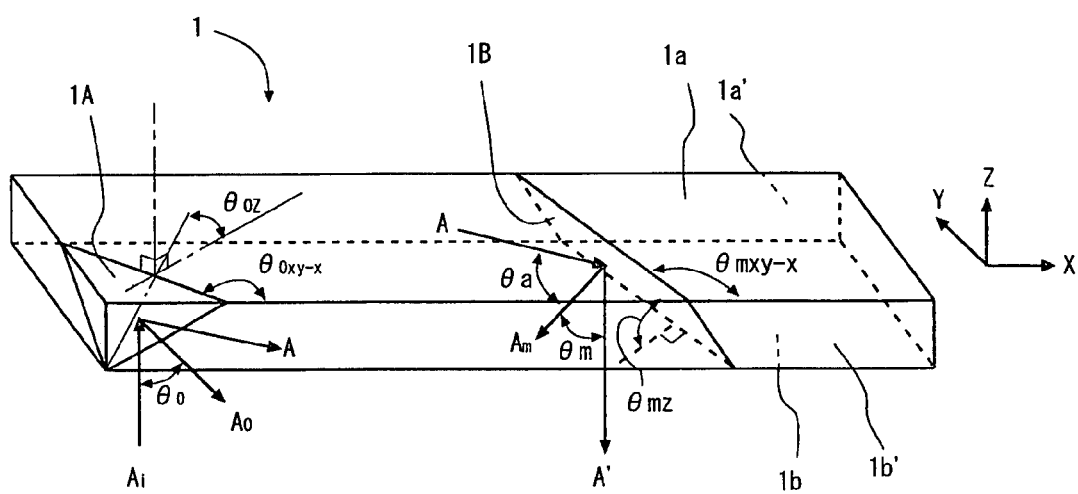
FIG. 8 is a diagram for illustrating a selection method of arrangement attitude of an introduction mirror 1A and the deflection mirror 1B.

AI is the direction cosine of the component LI of the light ray on the axis of the image-carrying light flux L1 immediately after reflected by the introduction mirror 1A, a parameter of the direction of the component LI (refer to FIG. 8).

$$AII = (\alpha, -\beta, \gamma)$$

AII is the direction cosine of the component LII of the light ray on the axis of the image-carrying light flux L1, a parameter of the direction of the component LII.

$$AIII = (\alpha, \beta, -\gamma)$$

AIII is the direction cosine of the component LIII of the light ray on the axis of the image-carrying light flux L1, a parameter of the direction of the component LIII.

$$AIV = (\alpha, -\beta, -\gamma)$$

AIV is the direction cosine of the component LIV of the light ray on the axis of the image-carrying light flux L1, a parameter of the direction of the component LIV. Incidentally, the relationship among the parameters AI, AII, AIII, and AIV results from the fact that when the light ray on the axis of the image-carrying light flux L1 is reflected by any one of the surfaces $1a'$, $1b'$, the sign of the component $\beta$ of the direction cosine is reversed, and when the light ray on the axis is reflected by any one of the surfaces $1a$, $1b$, the sign of the component $\gamma$ of the direction cosine is reversed.

$$A_i = (\alpha_i, \beta_i, \gamma_i)$$

$A_i$ is the direction cosine of the optical axis of the image-carrying light flux L1 incident to the substrate 1, a parameter of the image-carrying light flux L1 incident to the substrate 1 (refer to FIG. 8).

$$A_0 = (\alpha_0, \beta_0, \gamma_0)$$

$A_0$ is the direction cosine of the normal of the introduction mirror 1A, a parameter of the introduction mirror 1A (refer to FIG. 8).

A = any one of AI, AII, AIII, and AIV

A is the direction cosine of the light ray on the axis of the image-carrying light flux L1 that propagates through the substrate 1, a parameter of the light ray on the axis of the image-carrying light flux L1 that propagates through the substrate 1 (refer to FIG. 8).

$$A_m = (\alpha_m, \beta_m, \gamma_m)$$

$A_m$ is the direction cosine of the normal of the deflection mirror 1B, a parameter of the deflection mirror 1B (refer to FIG. 8).

$$A' = (\alpha', \beta', \gamma')$$

A' is the direction cosine of the light ray on the axis of the image-carrying light flux L1 emitted to the eye of the viewer from the substrate 1, a parameter of the image-carrying light flux L1 emitted from the substrate 1 (refer to FIG. 8).

Angle Parameters $\theta_{XY\text{-}X}$ is the angle formed by the projection of the image-carrying light flux L1 that propagates through the substrate 1 onto the XY plane of the light ray on the axis with the X axis, a parameter of the image-carrying light flux L1 that propagates through the substrate 1. Incidentally, the parameter $O_{XY\text{-}x}$ of the image-carrying light flux L1 (that is the component LI) immediately after reflected by the introduction mirror 1A is expressed by $\theta_{XY\text{-}X} = \tan^{-1}(\beta/\alpha)$.

$\theta_z$ is the angle formed by the light ray on the axis of the image-carrying light flux L1 that propagates through the substrate 1 with the Z axis, a parameter of the image-carrying light flux L1 that propagates through the substrate 1. $\theta_0$ is the incident angle of the light ray on the axis of the image-carrying light flux L1 to the introduction mirror 1A, a parameter of the image-carrying light flux L1 incident to the substrate 1 (refer to FIG. 8). $\theta_{0XY\text{-}X}$ is the angle formed by the intersection line between the introduction mirror 1A and the XY plane with the X axis, a parameter of the arrangement attitude of the introduction mirror 1A.

$\theta_{0Z}$ is the angle formed by the introduction mirror 1A with the XY plane, a parameter of the arrangement attitude of the introduction mirror 1A (refer to FIG. 8). $\theta_a$ is the incident angle of the light ray on the axis of the image-carrying light flux L1 incident to the deflection mirror 1B, a parameter of the image-carrying light flux L1 incident to the deflection mirror 1B (refer to FIG. 8). $\theta_{mXY\text{-}X}$ is the angle formed by the intersection line between the deflection mirror 1B and the XY plane with the X axis, a parameter of the arrangement attitude of the deflection mirror 1B (refer to FIG. 8).

$\theta_{mZ}$ is the angle formed by the deflection mirror 1B with the XY plane, a parameter of the arrangement attitude of the deflection mirror 1B (refer to FIG. 8). Here, the selection of the parameter $A_0$ of the arrangement attitude of the introduction mirror 1A is made based on the parameter $A_i$ of the image-carrying light flux L1 incident to the substrate 1, the parameter A of the image-carrying light flux L1 immediately after reflected by the introduction mirror 1A (that is, AI), and the expressions (2) and (3).

$$A_0 = (-A_i + A)/(2 \cos \theta_0) \tag{2}$$

$$\cos 2\theta_0 = A_i \cdot A \tag{3}$$

The expression (3) can be transformed into expression (3'):

$$\cos \theta_0 = \sqrt{[(\alpha_i \alpha + \beta_i \beta + \gamma_i \gamma + 1)/2]} \tag{3'}$$

In addition, by the same way of thinking, the selection of the parameter $A_m$ of the arrangement attitude of the deflection mirror 1B is made based on the parameter A of the image-carrying light flux L1 incident to the deflection mirror 1B (that is any one of AI, AII, AIII, and AIV), the parameter A' of the image-carrying light flux L1 emitted from the substrate 1, and expressions (4), (5).

$$A_m = (-A + A')/(2 \cos \theta_a) \tag{4}$$

$$\cos 2\theta_a = A \cdot A' \tag{5}$$

By the way, as described above, the light ray on the axis of the image-carrying light flux L1 is composed of any one of the four components (LI to LIV) irrespective of its position. A characteristic is given to the deflection mirror 1B so as to reflect only one component among them with a predetermined reflectance and transmit all of other three components.

However, it is possible to design the multilayer film only when the incident angle of light to be reflected with a predetermined reflectance by the deflection mirror 1B and the incident angle of light to be transmitted by the deflection mirror 1B are completely separate. Because of this, in the present embodiment, after the selection of the arrangement attitude of the above-described deflection mirror 1B etc., is made for each of the four components LI, LII, LIII, and LIV of the image-carrying light flux L1, an optimal one is selected by their comparison. Next, the selection method will be described specifically.

First, it is assumed that the parameter $A_i$ of the image-carrying light flux L1 incident to the substrate 1 is selected as (1, 1, 0), the parameter A' of the image-carrying light flux L1 emitted from the substrate 1 is selected as (0, 0, −1), and the parameter ($\theta_{XY-X}$, $\theta_Z$) of the component L1 of the image-carrying light flux L1 that propagates through the substrate 1 is selected as (45°, 135°). By the way, these parameters are selected, the positional relationship between the substrate 1 and the image-introduction unit 2, the positional relationship between the substrate 1 and the right eye of the viewer, etc., being taken into account.

At this time, the parameter ($\theta_{0XY-X}$, $\theta_{0Z}$) of the introduction mirror 1A is selected as (45°, 22.5°) uniquely. On the other hand, the parameter ($\theta_{mXY-X}$, $\theta_{mZ}$) of the deflection mirror 1B can be selected as any one of the following four ways:

(−135°, 67.5°),
(−135°, 22.5°),
(135°, 67.5°),
(135°, 22.5°).

Each parameter selected as described above is put into tables as shown in FIG. 28 to FIG. 35. In each table, the components LI, LII, LIII, and LIV are expressed as "light ray I", "light ray II", "light ray III", and "light ray IV", respectively. FIG. 28 is a table showing the parameters of the image-carrying light flux L1 incident to the substrate 1. Those in the dotted-lined frame are parameters $A_i$ (the direction cosine of the optical axis of the image-carrying light flux L1).

FIG. 29 is a table showing the parameters of the image-carrying light flux L1 immediately after reflected by the introduction mirror 1A. Those in the dotted-lined frame are parameters AI (the direction cosine of the image-carrying light flux L1). FIG. 30 is a table showing the parameters of the arrangement attitude of the introduction mirror 1A. Those in the dotted-lined frame are parameters $A_0$ (the direction cosine of the normal of the introduction mirror 1A). FIG. 31 is a table showing the parameters of the image-carrying light flux L1 emitted from the substrate 1. Those in the dotted-lined frame are parameters A' (the direction cosine of the image-carrying light flux L1).

FIG. 32 is a table showing the parameters of the arrangement attitude of the deflection mirror 1B to emit the component LI of the image-carrying light flux L1 to the outside of the substrate 1. Those in the dotted-lined frame are parameters $A_m$ (the direction cosine of the normal of the deflection mirror 1B). FIG. 33 is a table showing the parameters of the arrangement attitude of the deflection mirror 1B to emit the component LII of the image-carrying light flux L1 to the outside of the substrate 1. Those in the dotted-lined frame are parameters $A_m$ (the direction cosine of the normal of the deflection mirror 1B).

FIG. 34 is a table showing the parameters of the arrangement attitude of the deflection mirror 1B to emit the component LIII of the image-carrying light flux L1 to the outside of the substrate 1. Those in the dotted-lined frame are parameters $A_m$ (the direction cosine of the normal of the deflection mirror 1B). FIG. 35 is a table showing the parameters of the arrangement attitude of the deflection mirror 1B to emit the component LIV of the image-carrying light flux L1 to the outside of the substrate 1. Those in the dotted-lined frame are parameters $A_m$ (the direction cosine of the normal of the deflection mirror 1B).

Next, the respective parameters in FIG. 32, FIG. 33, FIG. 34, and FIG. 35 are compared and narrowed down to optimum ones. Optimum ones are those the incident angle of which of light to be reflected with a predetermined reflectance and the incident angle of which of light to be transmitted are completely separated. Here, the respective parameters in FIG. 32, FIG. 33, FIG. 34, and FIG. 35 are compared. First, as shown in the bottom right boxes in FIG. 32, according to the parameters in FIG. 32, the incident angles of the four components LI, LII, LIII, and LIV for the deflection mirror 1B are the following four angles:

Component LI: 67.5° (the component to emit light to outside of substrate 1),
Component LII: 22.5°,
Component LIII: 74.3°,
Component LIV: 74.3°

In addition, as shown in the bottom right boxes in FIG. 33, according to the parameters in FIG. 33, the incident angles of the four components LI, LII, LIII, and LIV for the deflection mirror 1B are the following four angles:

Component LI: 67.5°,
Component LII: 22.5° (the component to emit light to outside of substrate 1),
Component LIII: 49.21°,
Component LIV: 49.21°

In addition, as shown in the bottom right boxes in FIG. 34, according to the parameters in FIG. 34, the incident angles of the four components LI, LII, LIII, and LIV for the deflection mirror 1B are the following four angles:

Component LI: 74.3°,
Component LII: 74.3°,
Component LIII: 67.5° (the component to emit light to outside of substrate 1),
Component LIV: 22.5°

In addition, as shown in the bottom right boxes in FIG. 35, according to the parameters in FIG. 35, the incident angles of the four components LI, LII, LIII, and LIV for the deflection mirror 1B are the following four angles.

Component LI: 49.21°,
Component LII: 49.21°,
Component LIII: 67.5°,
Component LIV: 22.5° (the component to emit light to outside of substrate 1)

As a result of the comparison described above, it can be seen that the case where the reflection angle region and the transmission angle region can be separated by one threshold value is that shown in FIG. 33 or that shown in FIG. 35. Because of this, the parameters are narrowed down to those in FIG. 33 or FIG. 35, which is the case where the deflection mirror 1B can be manufactured easily using the multilayer film.

First Embodiment of Multilayer Film

Next, an embodiment of a multilayer film that realizes a deflection mirror 1B will be described. Here, a case will be described where the parameters in FIG. 33 have been selected. A characteristic to be given to the multilayer film is such one that the multilayer film reflects visible light incident at an incident angle of 22.5° with a predetermined reflectance and transmits visible light incident at an incident angle of 49.21° and an incident angle of 57.5°.

By the way, the parameters shown in FIG. 33 are the data about the light ray on the axis of the image-carrying light flux L1 and the actual image-carrying light flux L1 includes each light ray with an opening angle in accordance with the angle of view, and therefore, at the time of design of the multilayer film, they are taken into consideration. Because of this, a characteristic to be given to the multilayer film is such one that the multilayer film has a sufficient reflectance for the light flux of visible light incident at an incident angle of about 22.5° (the light flux with an opening angle in accordance with the angle of view) and a sufficient transmittance for the light flux of visible light incident at an incident angle of about 49° and an incident angle of about 67.5° (the light flux with an opening angle in accordance with the angle of view) (hereinafter, the angle of view is assumed to be 10°).

In addition, when an image display device 2a is an LCD, the image-carrying light flux L1 is polarized linearly, and therefore, by inserting a polarization plate into the image-carrying light flux L1, it is possible to limit the image-carrying light flux L1 only to p-polarization or limit the image-carrying light flux L1 only to s-polarization. Due to this, a characteristic optimum when the image-carrying light flux L1 is limited to p-polarization is given to the multilayer film.

By the way, as described above, the plurality of the deflection mirrors 1B is provided inside the substrate 1 and is arranged in parallel to the image-carrying light flux L1. Due to this, the reflectance of the individual deflection mirror 1B may be set to an individual value so that the amount of light of the individual image-carrying light flux L1 reflected by the individual deflection mirror 1B is made uniform. Here, a multilayer film used in one of the deflection mirrors 1B will be described.

The specifications of the multilayer film are determined as:
Angle of view: 10°,
Wavelength band: visible wide band (400 nm to 700 nm),
Reflectance Rp for p-polarization of an incident angle of 22.5±5°: 40%,
Transmittance Tp for p-polarization of incident angle of 45.21±5° to 67.5±5°: 100%.

The same configuration as that of the polarization beam splitter can be applied to the multilayer film. The typical configurations of the polarization beam splitter are the following three types:

Substrate/(0.25H0.25L)$^p$0.25H/Substrate,

Substrate/(0.125H0.25L0.125H)$^p$/Substrate,

Substrate/(0.125L0.25H0.125L)$^p$/Substrate, where:
"H": High-refractive index layer (H layer),
"L": Low-refractive index layer (L layer),
"p": Number of times of lamination of the layer group in the brackets.

The numerical value on the left side of each layer is the layer thickness of each layer (in units of design dominant wavelength λc).

In the present embodiment, of the above-described three configurations, the second configuration was used, and four layer groups of different layer thicknesses were used in order to extend the reflection band. Here, the following are assumed:
Refractive index of the substrate 1: 1.56,
Refractive index of H layer: 1.67,
Refractive index of L layer: 1.46,
Design dominant wavelength λc: 450 nm The configuration of the multilayer film in the present embodiment is as follows:

Substrate/(0.125H0.25L0.125H)$^7$(0.15H0.3L0.15H)$^7$ (0.175H0.35L0.175H)$^7$(0.205H0.41L0.205H)$^7$/Substrate In FIG. 36, the configuration of this multilayer film is shown (in FIG. 36, "substrate" is expressed as "plane substrate"; this applies to other tables).

Figure 9:
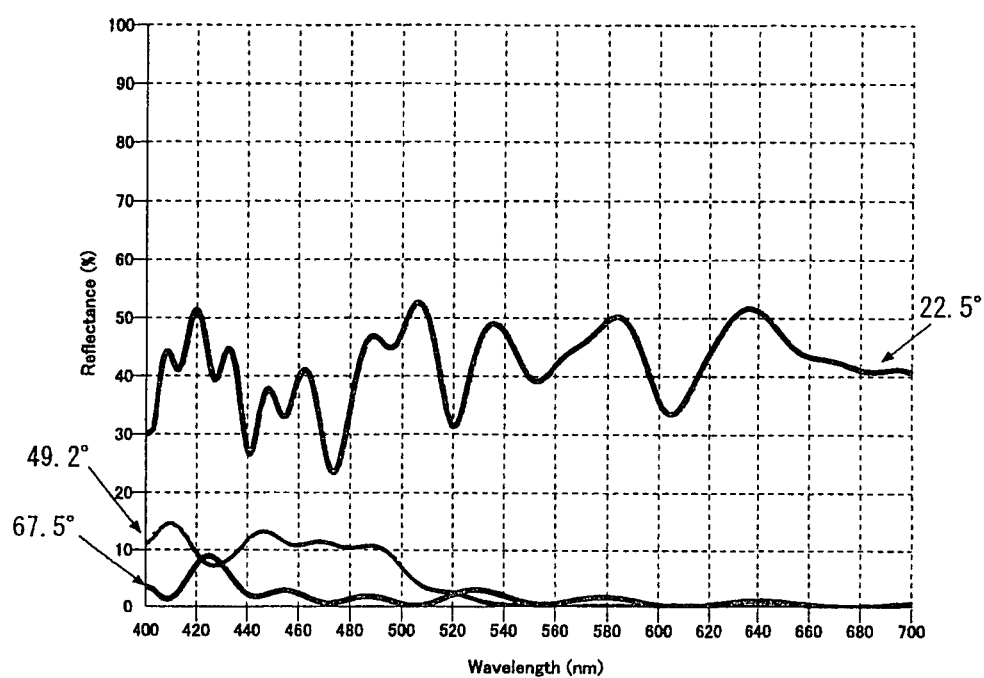
FIG. 9 is a diagram showing a wavelength characteristic of the reflectance of a multilayer film in the first embodiment.
Figure 10:
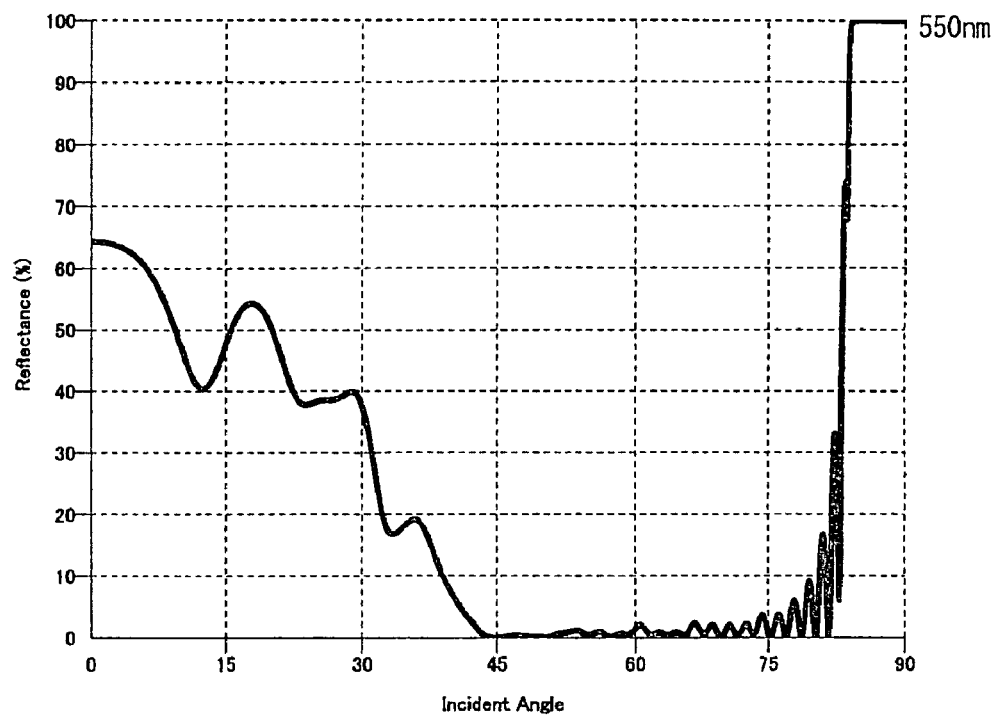
FIG. 10 is a diagram showing an angular characteristic of the reflectance for p-polarization of a wavelength of 550 nm of the multilayer film in the first embodiment.

In FIG. 9, the wavelength characteristic of reflectance of the multilayer film is shown. In FIG. 9, the characteristic for p-polarization of an incident angle of 22.5°, the characteristic for p-polarization of an incident angle 49.2°, and the characteristic for p-polarization of an incident angle of 67.5° are shown. In FIG. 10, the angular characteristic of reflectance for p-polarization of a wavelength of 550 nm of the multilayer film is shown.

Second Embodiment of Multilayer Film

Figure 11:
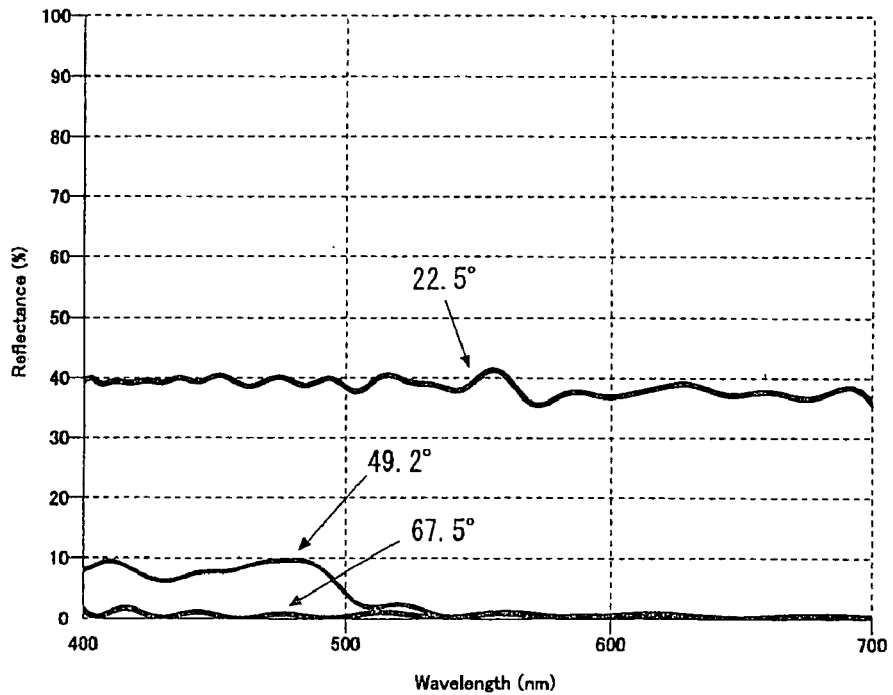
FIG. 11 is a diagram showing a wavelength characteristic of the reflectance of a multilayer film in a second embodiment.
Figure 12:
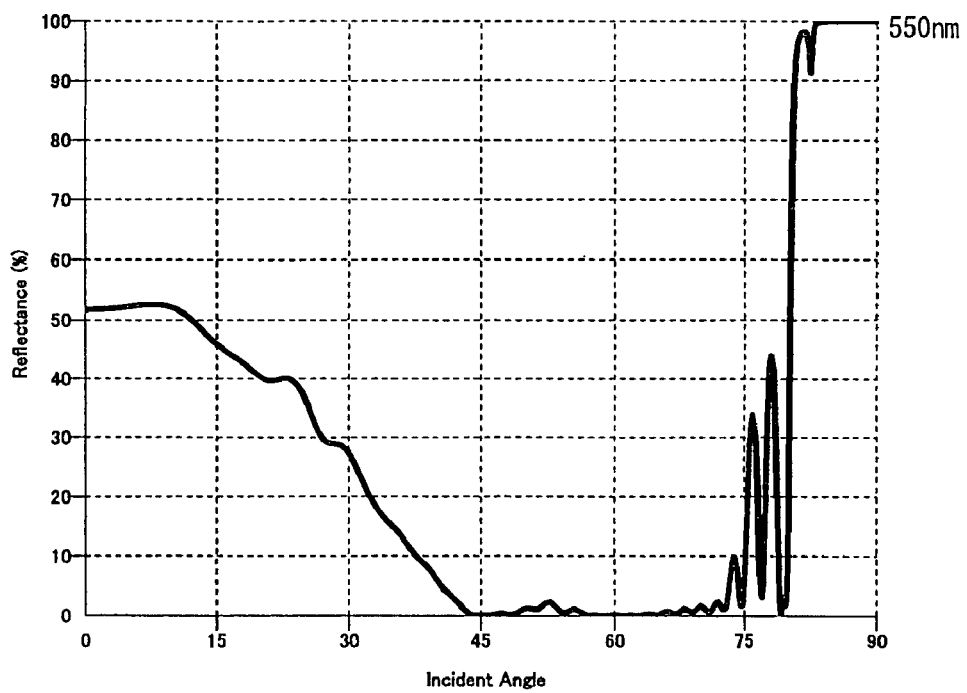
FIG. 12 is a diagram showing an angular characteristic of the reflectance for p-polarization of a wavelength of 550 nm of the multilayer film in the second embodiment.

In the present embodiment, an improvement (flattening of reflectance) has been carried out by optimizing the layer thickness of each layer using a computer based on the multilayer film in the first embodiment. In FIG. 37, the configuration of the multilayer film is shown. In FIG. 11, the wavelength characteristic of reflectance of the multilayer film is shown. In FIG. 11, the characteristic for p-polarization of an incident angle of 22.5°, the characteristic for p-polarization of an incident angle 49.2°, and the characteristic for p-polarization of an incident angle of 67.5° are shown. In FIG. 12, the angular characteristic of reflectance for p-polarization of a wavelength of 550 nm of the multilayer film is shown.

Third Embodiment of Multilayer Film

Figure 13:
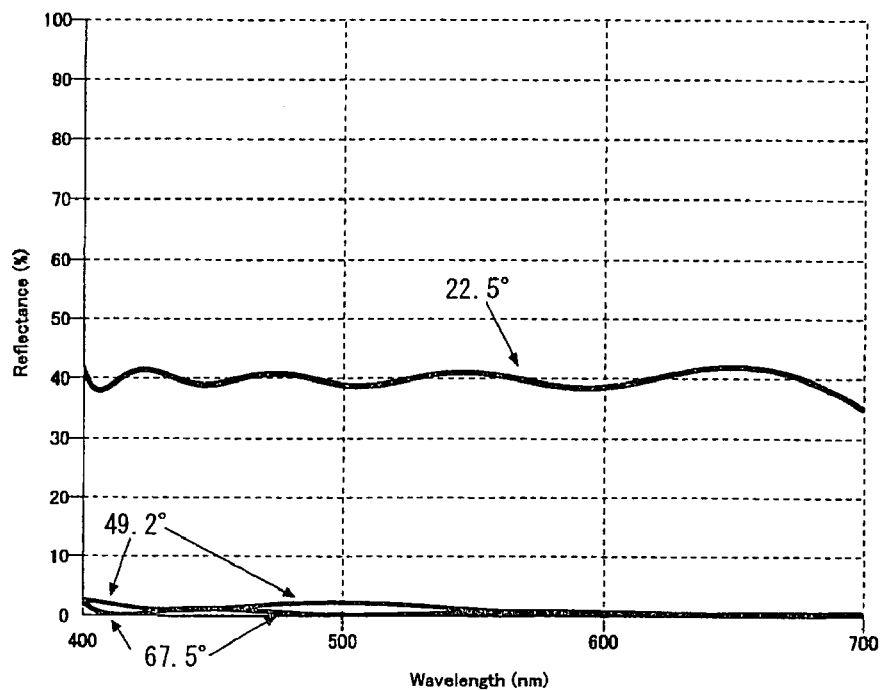
FIG. 13 is a diagram showing a wavelength characteristic of the reflectance of a multilayer film in a third embodiment.
Figure 14:
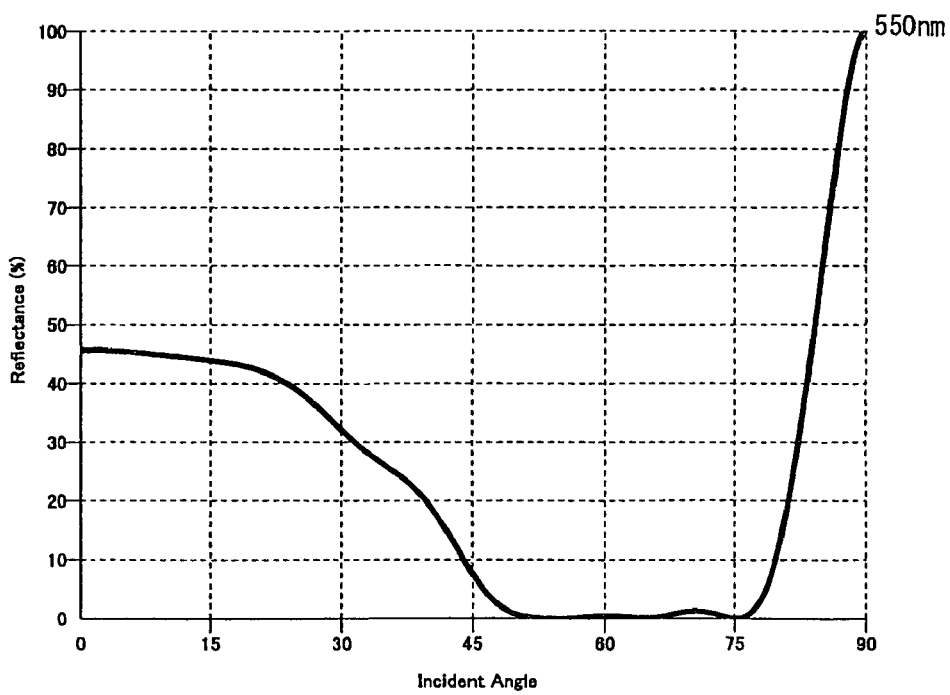
FIG. 14 is a diagram showing an angular characteristic of the reflectance for p-polarization of a wavelength of 550 nm of the multilayer film in the third embodiment.

In the present embodiment, a further improvement has been carried out to the multilayer film in the second embodiment in an attempt to reduce the number of layers. In order to reduce the number of layers, a material with a high-refractive index was used for the H layer. In FIG. 38, the configuration of the multilayer film is shown. In FIG. 13, the wavelength characteristic of reflectance of the multilayer film is shown. In FIG. 13, the characteristic for p-polarization of an incident angle of 22.5°, the characteristic for p-polarization of an incident angle 49.2°, and the characteristic for p-polarization of an incident angle of 67.5° are shown. In FIG. 14, the angular characteristic of reflectance for p-polarization of a wavelength of 550 nm of the multilayer film is shown.

Fourth Embodiment of Multilayer Film

Figure 15:
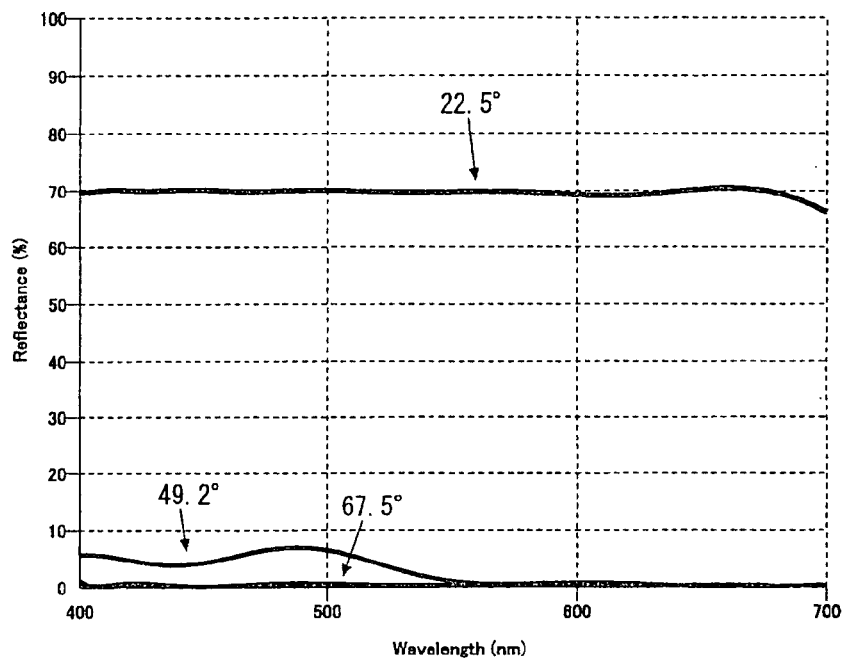
FIG. 15 is a diagram showing a wavelength characteristic of the reflectance of a multilayer film in a fourth embodiment.
Figure 16:
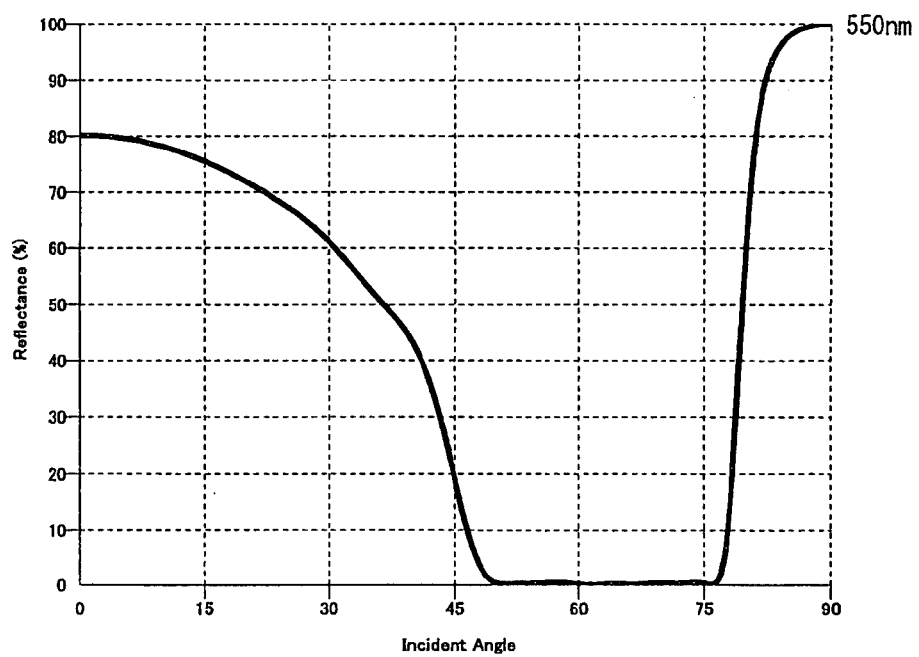
FIG. 16 is a diagram showing an angular characteristic of the reflectance for p-polarization of a wavelength of 550 nm of the multilayer film in the fourth embodiment.

In the present embodiment, a multilayer film having different specifications from those in the above-described embodiments was designed. The reflectance Rp set for the multilayer film is 70%. Here, the following are assumed:
Refractive index of the substrate 1: 1.56,
Refractive index of H layer: 2.30,
Refractive index of L layer: 1.46,
Design dominant wavelength λc: 450 nm In FIG. 39, the configuration of the multilayer film is shown. In FIG. 15, the wavelength characteristic of reflectance of the multilayer film is shown. In FIG. 15, the characteristic for p-polarization of an incident angle of 22.5°, the characteristic for p-polarization of an incident angle 49.2°, and the characteristic for p-polarization of an incident angle of 67.5° are shown. In FIG. 16, the angular characteristic of reflectance for p-polarization of a wavelength of 550 nm of the multilayer film is shown.

As described above, due to the optimization by a computer, it is possible to design multilayer films in accordance with various specifications. By applying these multilayer films to the deflection mirror 1B, it is possible to give the above-described characteristic to the deflection mirror 1B without fail.

Fifth Embodiment of Multilayer Film

Figure 17:
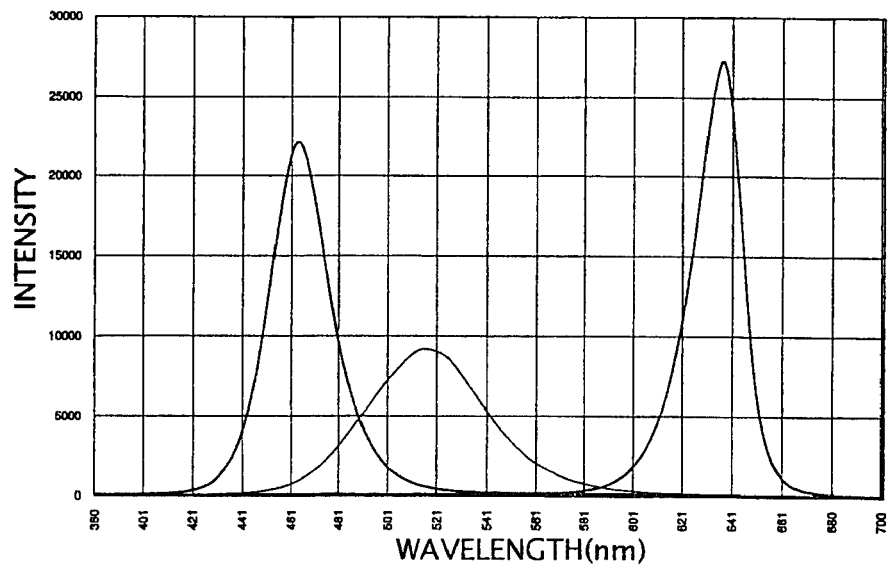

In the present embodiment, a multilayer film optimum when the wavelength component included in the image-carrying light flux L1 is limited to a specific wavelength component was designed. In general, when an LED is used as the light source of the image display device 2a, its light emission spectrum has three peaks corresponding to R color, G color, and B color, respectively, as shown in FIG. 17. At this time, it can be regarded that what is included in the image-carrying light flux L1 is only the three wavelength components corresponding to their peaks. In this case, even if the wavelength components to be reflected by the multilayer film in the present embodiment are limited to the three wavelength components, the amount of light of the image-carrying light flux L1 to form a virtual image is hardly lost.

Figure 18:
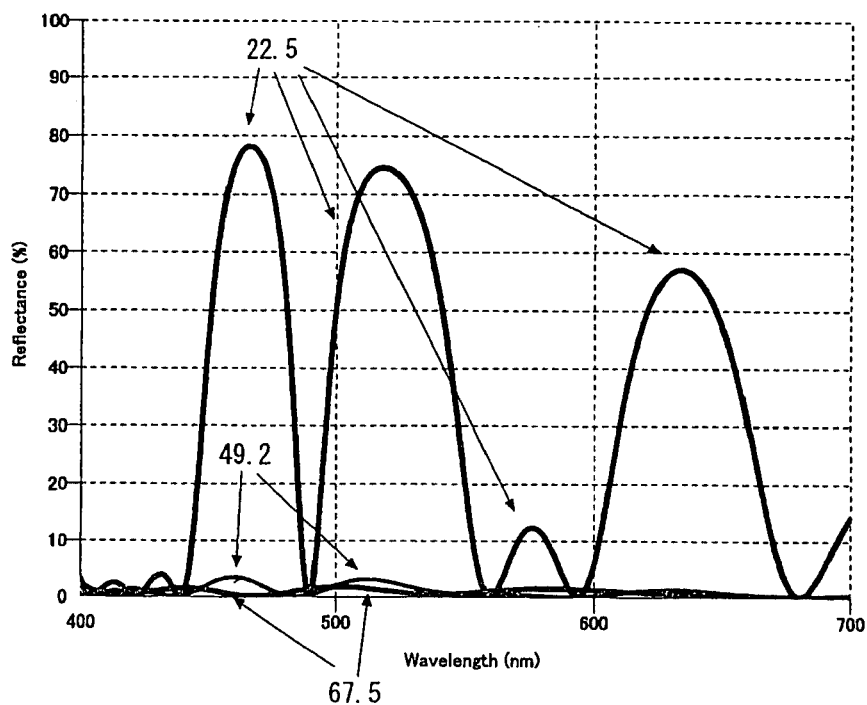
FIG. 18 is a diagram showing a wavelength characteristic of the reflectance of a multilayer film in a fifth embodiment.

Because of this, in the present embodiment, a multilayer film was designed in the present embodiment, the wavelength components of which to be reflected are limited only to the three wavelength components. Here, the following is assumed:

Reflectance Rp: 70%,
Refractive index of the substrate 1: 1.56,
Refractive index of H layer: 2.30,
Refractive index of L layer: 1.46,
Design dominant wavelength λc: 450 nm In FIG. 40, the configuration of the multilayer film is shown. In FIG. 18, the wavelength characteristic of reflectance of the multilayer film is shown. In FIG. 18, the characteristic for p-polarization of an incident angle of 22.5°, the characteristic for p-polarization of an incident angle 49.2°, and the characteristic for p-polarization of an incident angle of 67.5° are shown.

Other Embodiments

By the way, the section of the substrate 1 of the present eyeglass display (the section formed when cut in a plane parallel to the YZ plane) is a rectangle (square). However, as shown in FIG. 19(a), the section of the substrate 1 may be a triangle. In this case, the image-carrying light flux L1 propagates through the substrate 1 while being internally reflected at three surfaces, for example, as shown by arrows in FIG. 19(a). At this time, the components of the image-carrying light flux L1 are the three components LI, LII, and LIII. In addition, the section of the substrate 1 may be another rectangle. In this case, the image-carrying light flux L1 propagates through the substrate 1 while being internally reflected at four surfaces, for example, as shown in FIG. 19(b). At this time, the components of the image-carrying light flux L1 are the four components LI, LII, LIII, and LIV.

In addition, the section of the substrate 1 may be a pentagon as shown in FIG. 19(c). In this case, the image-carrying light flux L1 propagates through the substrate 1 while being internally reflected at five surfaces, for example, as shown in FIG. 19(c). At this time, the components of the image-carrying light flux L1 are the five components LI, LII, LIII, LIV, and LV. By the way, a not shown deflection mirror is provided to the substrate 1 so that the image-carrying light flux L1 that propagates through the substrate 1 shown in FIGS. 19(a) to 19(c) is emitted from any one of these surfaces.

In any case, if the introduction mirror 1A is arranged inside the substrate 1 so that the image-carrying light flux L1 is internally reflected at all of the other surfaces of the plurality of surfaces having substantially the vertical relationship to the section vertical to the surface of the substrate 1 from which the image-carrying light flux L1 is emitted and the surface shown in FIG. 19 from which the image-carrying light flux L1 is emitted, and the deflection mirror 1B is arranged inside the substrate 1 or on the surface of the substrate 1 so that the image-carrying light flux L1 is emitted to the outside of the substrate 1, an eyeglass display having the same function as that of the present eyeglass display is realized.

However, in the substrate 1 of the present eyeglass display (refer to FIG. 2), the substrate 1 shown in FIG. 19(b), etc., any two of the sides of the substrate 1 are parallel to each other. Therefore, it is possible to improve the visual recognizability of the external by making parallel the boundary surface (the side of the substrate 1) present between the eye of the viewer (viewing eye) and the external.

Modification Example of the Introduction Mirror 1A Deflection Mirror 1B

By the way, for the introduction mirror 1A shown in FIG. 2, a holographic optical film can be also used instead of a multilayer film. Further, for the deflection mirror 1B shown in FIG. 2, a holographic optical film can be used instead of a multilayer film. Furthermore, instead of the plurality of the deflection mirrors 1B and the optical film 1D shown in FIG. 6, a holographic optical film that plays the same role as those can also be used. In this case, the plane substrate 1' is not necessary.

In addition, instead of the plurality of the deflection mirrors 1B, the plurality of the deflection mirrors 1B', and the optical film 1D shown in FIG. 6, a holographic optical film that plays the same role as those can also be used. In this case, the plane substrate 1' is not necessary. Here, a holographic optical film will be described, which can be applied instead of the plurality of the deflection mirrors 1B and the optical film 1D shown in FIG. 6.

Figure 20:
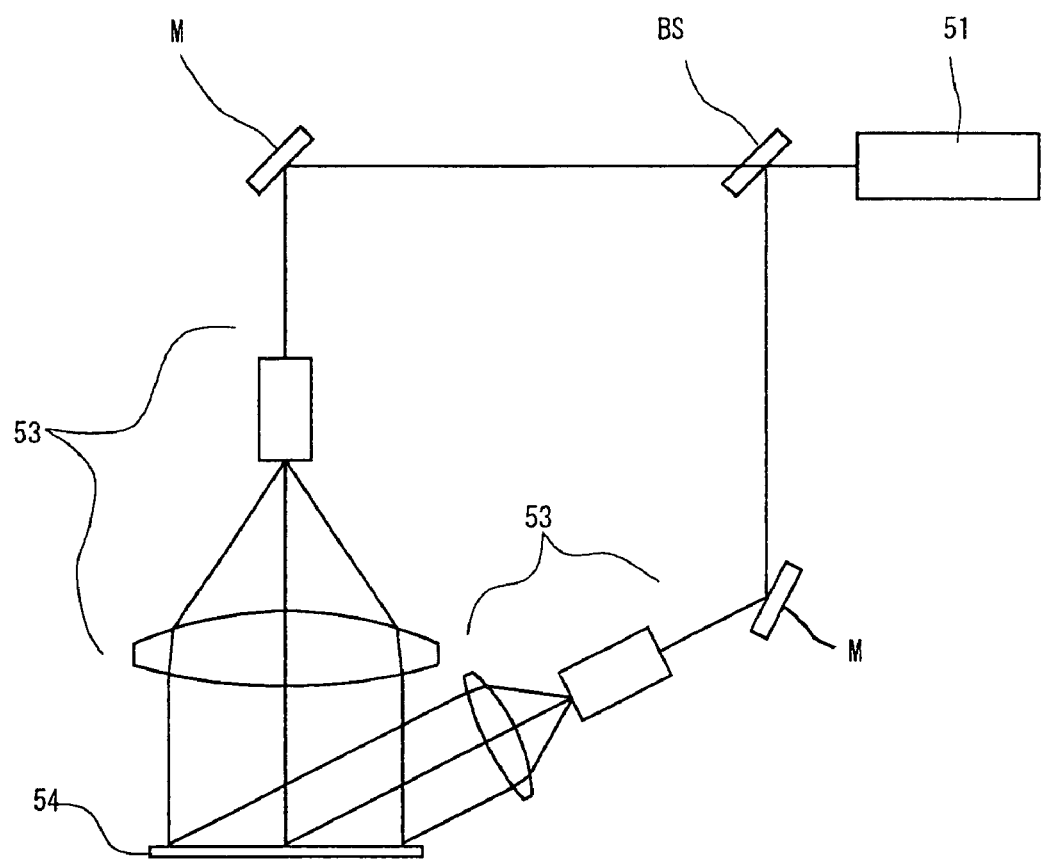
FIG. 20 is a configuration diagram of an exposure optical system.

To manufacture the holographic optical film, for example, an exposure optical system shown in FIG. 20 is used. In FIG. 20, a laser light source is denoted by symbol 51; a beam splitter is denoted by symbol BS; a mirror by symbol M; a beam expander by symbol 53; and a photosensitive material by symbol 54.

Figure 21:
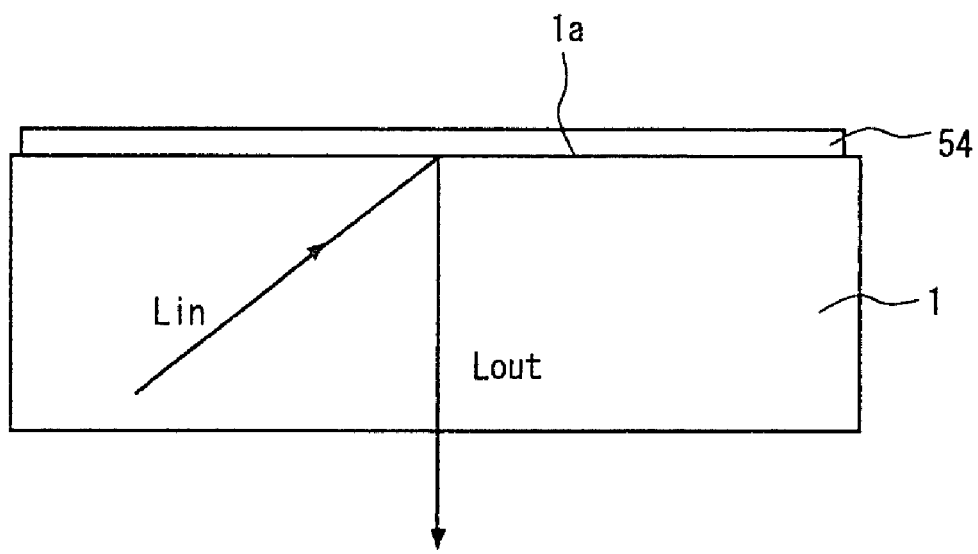
FIG. 21 is a diagram for illustrating a function of the substrate 1 to which a holographic optical film 54 has been applied.

As shown in FIG. 20, two light fluxes are caused to enter from a predetermined direction and the pattern of the interference fringe the two light fluxes form is transferred to the photosensitive material 54 and developed, and thus a holographic optical film is completed. FIG. 21 is a conceptual diagram showing the substrate 1 in which the holographic optical film 54 is formed and the state of the image-carrying light flux that propagates through the substrate 1.

The holographic optical film 54 is provided on the surface 1a of the substrate 1. The holographic optical film 54 diffracts an image-carrying light flux (Lin) that is internally reflected inside and propagates through the substrate 1 and converts it into a light flux (Lout) that is emitted to the outside of the substrate 1. In this manner, the holographic optical film 54 can control the emission direction of an image-carrying light flux. Note that, to the manufacture of the holographic optical film 54, injection molding using a fine die, microlithography, etc., can be applied in addition to the exposure by the exposure optical system shown in FIG. 20.

Second Embodiment

Figure 22:
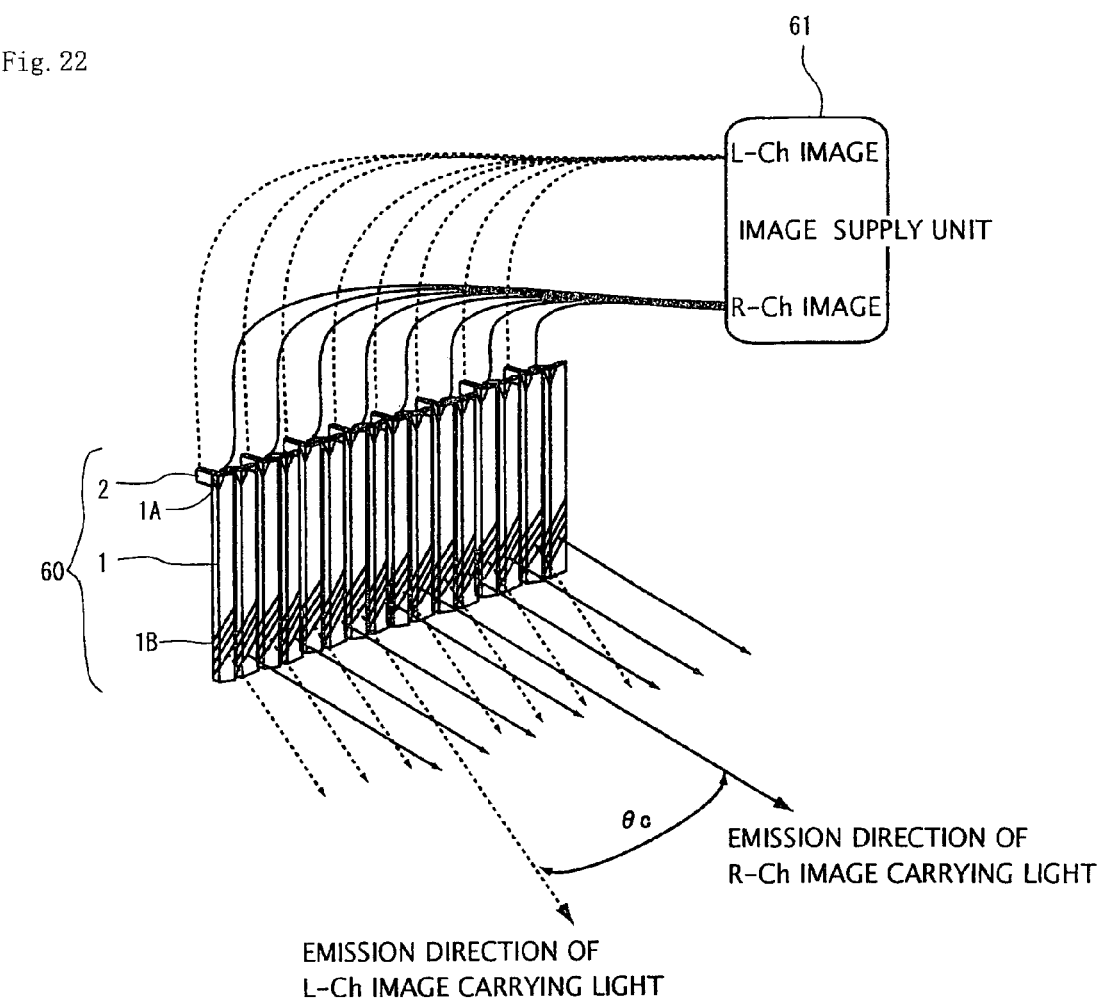
FIG. 22 is an outside appearance of a stereophonic virtual image display in the second embodiment.
Figure 23:
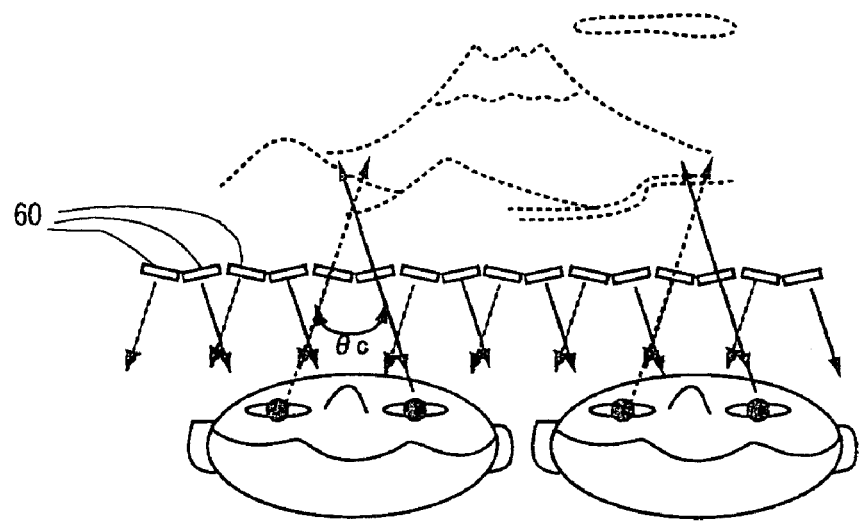
FIG. 23 is a diagram for illustrating an angle of arrangement of an optical system 60 in the second embodiment.

A second embodiment of the present invention will be described below based on FIG. 22, FIG. 23. The present embodiment is one of a large-sized stereophonic virtual image display. FIG. 22 is an outside appearance of the present stereophonic virtual image display. As shown in FIG. 22, the present stereophonic virtual image display includes a plurality of image display optical systems 60 consisting of the substrate 1 and the image-introduction unit 2 of any one of the eyeglass displays in the first embodiment. In the substrate 1, for example, the introduction mirror 1A and the plurality of the deflection mirrors 1B are provided in a predetermined relationship.

However, the substrate 1 of the individual image display optical systems 60 is elongate in the horizontal direction when viewed from the viewer and has a rod-like shape elongated in the vertical direction. The image-introduction unit 2 is linked to one end of the substrate 1. The plurality of the image display optical systems 60 are arranged side by side in the horizontal direction in front of the viewer. The exit pupils of the individual image display optical systems 60 are formed on the side of the viewer side by side in the horizontal direction. The right and left eyes of the viewer are arranged in any region in which the exit pupil is formed.

To the individual image display optical systems 60, an image supply unit 61 is connected. The image supply unit 61 outputs the signal of an L-Ch image to be displayed to the left eye of the viewer and the signal of an R-Ch image to be displayed to the right eye of the viewer. The L-Ch image and the R-Ch image are stereogram images. The signal of the L-Ch image is input to the image display optical systems 60 arranged alternately, respectively. Each of these image display optical systems 60 forms a virtual image of the L-Ch image at a position a predetermined distance behind the image display optical system 60, respectively.

The signal of the R-Ch image is input to the rest of the image display optical systems 60, respectively. Each of these image display optical systems 60 forms a virtual image of the R-Ch image at a position a predetermined distance behind the image display optical system 60, respectively. Consequently, the viewer can, when placing the pupils of the right and left eyes at any position of the exit pupil, view the virtual images of the L-Ch image and the R-Ch image.

Since the individual image display optical systems 60 consist of the substrate 1 and the image-introduction unit 2 described in the first embodiment, the viewer can view the virtual image with the angle of view wide both longitudinally and transversely even though the substrate 1 is the elongated rod-like shape. Here, as shown in FIG. 23, the image display optical system 60 that displays the L-Ch image and the image display optical system 60 that displays the R-Ch image are arranged an angle of θc apart from each other.

The angle θc is caused to coincide with the angle of congestion when the viewer views an object present at the predetermined distance with both eyes. Consequently, the viewer can view the L-Ch image with left eye and the R-Ch image with right eye, respectively. As a result, a vivid stereophonic virtual image can be viewed. In addition, if the image display optical systems 60 are arranged in a wide range, it is possible to widen the range of arrangement of the eye for the viewer to view the stereophonic virtual image. Further, a plurality of viewers can view the same stereophonic virtual image simultaneously.

Third Embodiment

Figure 24:
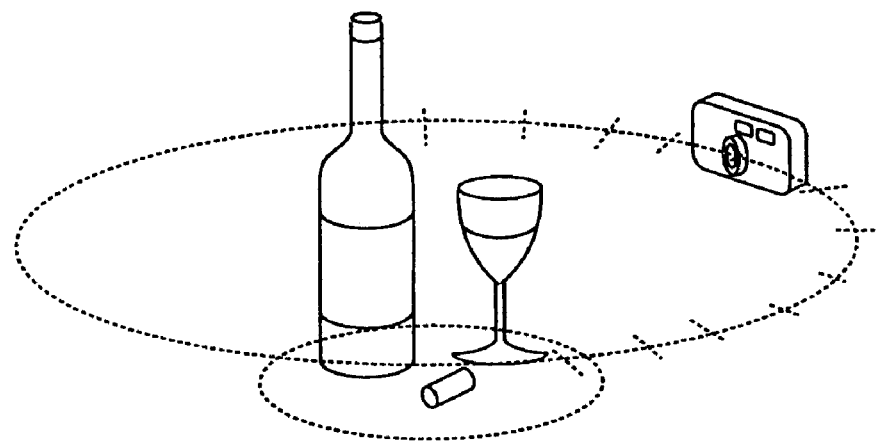
FIG. 24 is a diagram for illustrating a method of acquiring signals for a 360-degree stereophonic virtual image display in the third embodiment.

A third embodiment of the present invention will be described below based on FIG. 24, FIG. 25. The present embodiment is one of a 360-degree stereophonic virtual image display. First, a method of acquiring signals to be supplied to the present stereophonic virtual image display will be described. In order to acquire signals, an object is photographed at each of n kinds of equidistant positions from the object. Each of the n kinds of positions is one of positions equally divided into n positions at an angle of 360° divided by n around the object.

In this manner, n image signals (signal of 1-Ch image, signal of 2-Ch image, ..., signal of n-Ch image) are recorded. Note that the division number n is set to a sufficiently great value so that a 360-degree stereophonic virtual image, to be described later, can be viewed successively. Next, the configuration of the present stereophonic virtual image display will be described.

Figure 25:
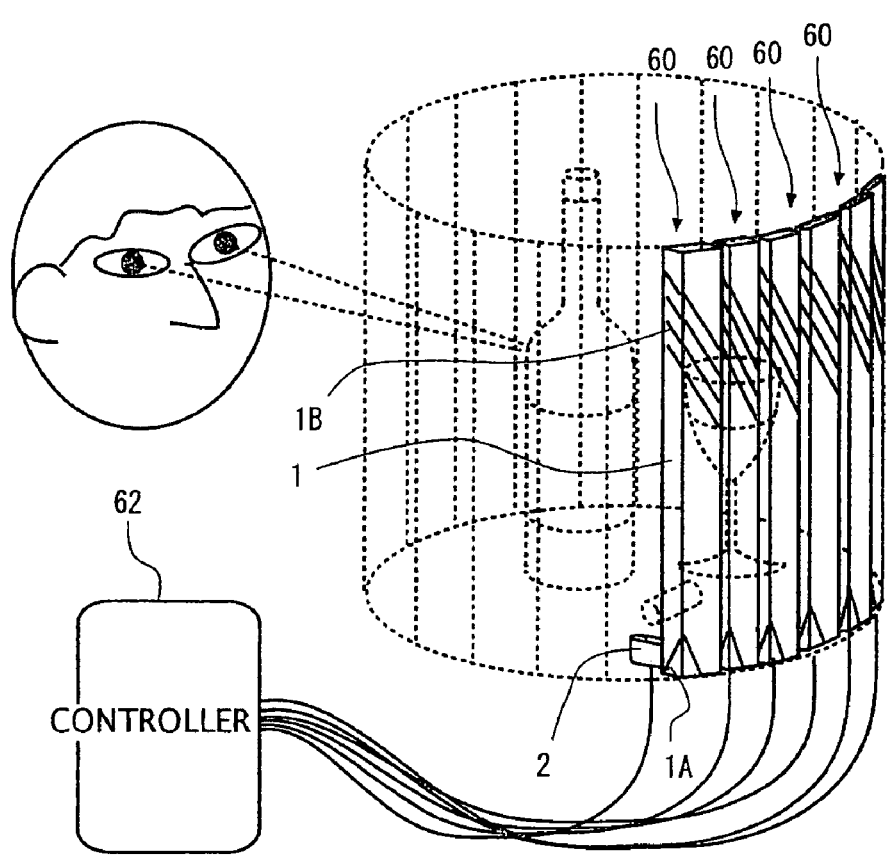
FIG. 25 is an outside appearance of the 360-degree stereophonic virtual image display in the third embodiment.

FIG. 25 is an outside appearance of the present stereophonic virtual image display. As shown in FIG. 25, the present stereophonic virtual image display includes n of the image display optical systems 60 consisting of the substrate 1 and the image-introduction unit 2 of any one of the eyeglass displays in the first embodiment. In the substrate 1, for example, the introduction mirror 1A and the plurality of the deflection mirrors 1B are provided in a predetermined relationship. The substrate 1 of the individual image display optical systems 60 is thin in the horizontal direction when viewed from the viewer and has a rod-like shape elongated in the vertical direction. The image-introduction unit 2 is linked to one end of the substrate 1. The n image display optical systems 60 are arranged in a cylindrical form in front of the viewer. The exit pupils of the individual image display optical systems 60 are formed side by side on the outside of the cylinder. The right and left eyes of the viewer are arranged at any position of the exit pupil.

To the individual image display optical systems 60, a controller 62 is connected. The controller 62 outputs the n signals (signal of 1-Ch image, signal of 2-Ch image, ..., signal of n-Ch image) recorded in advance. The n signals are input to the n image display optical systems 60, individually. Each of these image display optical systems 60 forms the virtual images of 1-Ch image, 2-Ch image, ..., n-Ch image at the center position of the cylinder, respectively.

Consequently, the viewer can, when arranging the pupil of the eye at any position of the cylindrical exit pupil, view the virtual image of the image corresponding to the position (virtual image of the object when viewed from the position). Further, the viewer can, when shifting the position of arrangement of the eye in the circumferential direction of the cylinder, view the virtual image of the object when viewed from the shifted position. In other words, the viewer can view the 360-degree stereophonic virtual image of the object.

Since the individual image display optical systems 60 consist of the substrate 1 and the image-introduction unit 2 described in the first embodiment, the viewer can view the virtual image with the angle of view wide both longitudinally and transversely even though the substrate 1 is the elongated rod-like shape. In addition, in the present stereophonic virtual image display, if signals of still images are used, it is possible to view a 360-degree stereophonic virtual image of the still images, and if signals of motion images are used, it is possible to view a 360-degree stereophonic virtual image of the motion images.

In addition, in the present stereophonic virtual image display, although the signals of the image acquired by photographing the object are used, signals of an image combined by a computer may be used.

Fourth Embodiment

Figure 26:
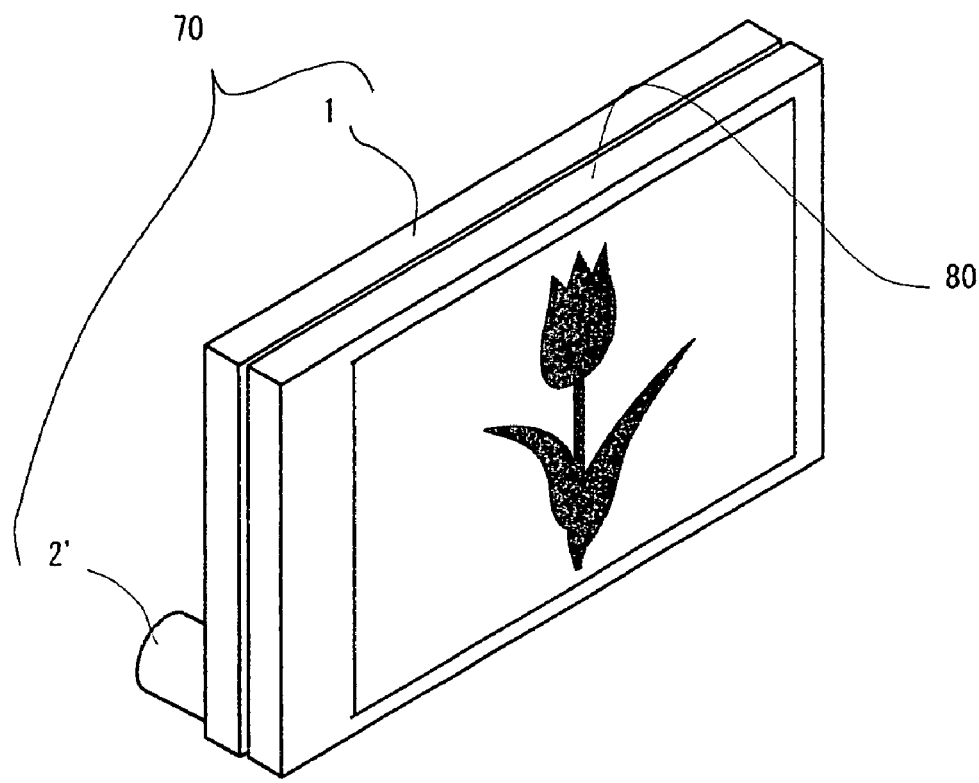
FIG. 26 is an outside appearance of a liquid crystal display in the fourth embodiment.
Figure 27:
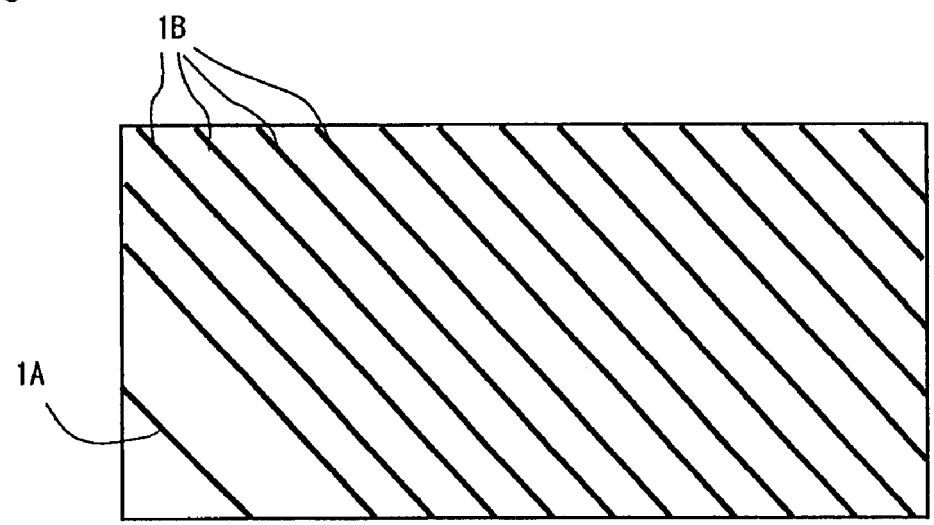
FIG. 27 is a diagram for illustrating the substrate 1 in the fourth embodiment.

A fourth embodiment of the present invention will be described below based on FIG. 26, FIG. 27. The present embodiment is one of a liquid crystal display. FIG. 26 is an outside appearance of the present liquid crystal display. The present liquid crystal display includes a liquid crystal panel 80 and an illuminating optical system 70 that illuminates it from behind. The illuminating optical system 70 consists of the substrate 1 and an illuminating unit 2' of any one of the eyeglass displays in the first embodiment. In the substrate 1, for example, the introduction mirror 1A and the plurality of the deflection mirrors 1B are provided in a predetermined relationship.

However, the substrate 1 in the present embodiment has a shape large in size in the longitudinal and transverse directions and thin in depth. When the substrate 1 is viewed from front, the introduction mirror 1A is arranged in one of the four corners, as shown in FIG. 27, and the plurality of the deflection mirrors 1B is arranged side by side substantially all over the surface. The illuminating unit 2' emits an illumination light flux to illuminate each position of the liquid crystal panel 80 toward the introduction mirror 1A.

As with the image-carrying light flux L1 in the first embodiment, the illumination light flux propagates through the substrate 1 while being reflected internally and is deflected toward the outside of the substrate 1 by the plurality of the deflection mirrors 1B, and thus each position of substantially all of the surfaces of the liquid crystal panel 80 is illuminated. The opening angle of the illumination light flux that illuminates the liquid crystal panel 80 is kept wide both longitudinally and transversely as with the image-carrying light flux L1 in the first embodiment.

Consequently, each position of the liquid crystal panel 80 is illuminated by the illumination light flux with an angular range wide both longitudinally and transversely. Due to this, despite its thinness, the present liquid crystal display is a high-performance liquid crystal display with which the viewer can visually recognize an image in the angular range wide both longitudinally and transversely. By the way, the present liquid crystal display has various uses, such as in TV, mobile phone, display of a personal computer, etc.

The invention is not limited to the above-described embodiments, which are exemplary of various embodiments of the invention. Modifications in whole or in part, including modifications to one or more components, may be made to any of the various embodiments without departing from the spirit and scope of the invention.

The invention claimed is:

1. An image display optical system, comprising:
   a prism-shaped substrate having at least three lateral faces and being transparent to an image-carrying light flux to be projected to a viewing eye;
   an introduction unit that turns said image-carrying light flux into a light flux that propagates in the substrate while being internally reflected at the at least three lateral faces by deflecting said image-carrying light flux entering the substrate from outside said substrate; and
   an output unit that guides said image-carrying light flux, being internally reflected inside the substrate at the at least three lateral faces, from said substrate to said viewing eye.

2. The image display optical system according to claim 1, wherein said introduction unit includes a reflecting surface that is not parallel to any of the lateral faces.

3. The image display optical system according to claim 1, wherein said output unit includes a plurality of partially reflecting surfaces parallel to one another provided inside said substrate.

4. The image display optical system according to claim 1, wherein said output unit includes:
   an optical film provided on at least a portion of the lateral faces, the optical film emitting part of said image-carrying light flux to the outside; and
   a plurality of reflecting surfaces parallel to one another provided on the opposite side of the substrate of said optical film.

5. The image display optical system according to claim 3, wherein any one of said plurality of reflecting surfaces includes a holographic optical film.

6. The image display optical system according to claim 4, wherein any one of said plurality of reflecting surfaces includes a holographic optical film.

7. The image display optical system according to claim 1, wherein said output unit includes a holographic optical film provided on any one of the lateral faces of said substrate.

8. An image display unit, comprising:
   an image display device that emits an image-carrying light flux to be projected to a viewing eye; and
   the image display optical system according to any one of claim 1 to claim 7, which guides said image-carrying light flux to said viewing eye.

9. The image display unit of claim 8, further comprising a mounting unit that mounts said image display unit on the head of a viewer.

10. An illuminating optical system, comprising:
    a prism-shaped substrate having at least three lateral faces and being transparent to an illumination light flux to illuminate a region to be illuminated;
    an introduction unit that turns said illumination light flux that propagates while being internally reflected at the at least three lateral faces by deflecting said illumination light flux entering the substrate from outside said substrate; and
    an output unit that guides said illumination light flux being internally reflected at the at least three lateral faces from said substrate to said region to be illuminated.

11. The illuminating optical system according to claim 10, wherein said introduction unit includes a reflecting surface that is not parallel to any of the lateral faces.

12. The illuminating optical system according to claim 10, wherein said output unit includes a plurality of partially reflecting surfaces parallel to one another provided inside said substrate.

13. The illuminating optical system according to claim 10, wherein said output unit includes:
    an optical film provided on at least a portion of the lateral faces, the optical film emitting part of said illumination light flux to the outside; and
    a plurality of reflecting surfaces parallel to one another provided on the opposite side of the substrate of said optical film.

14. The illuminating optical system according to claim 12, wherein any one of said plurality of reflecting surfaces includes a holographic optical film.

15. The illuminating optical system according to claim 13, wherein any one of said plurality of reflecting surfaces includes a holographic optical film.

16. The illuminating optical system according to claim 10, wherein said output unit includes a holographic optical film provided on any one of the lateral faces.

17. A liquid crystal display unit, comprising:
a light source that emits an illumination light flux to illuminate a liquid crystal panel; and
the illuminating optical system according to any one of claim 10 to claim 16, which guides said illumination light flux to said liquid crystal panel.

* * * * *